US006427101B1

(12) United States Patent
Diaz et al.

(10) Patent No.: US 6,427,101 B1
(45) Date of Patent: Jul. 30, 2002

(54) LAND VEHICLE COMMUNICATIONS SYSTEM AND PROCESS FOR PROVIDING INFORMATION AND COORDINATING VEHICLE ACTIVITIES

(75) Inventors: R. Gary Diaz, Lincolnshire, IL (US); John J. Gemender; Steven J. Dager, both of Fort Wayne, IN (US); Ronald L. Baughman, Churubusco, IN (US)

(73) Assignee: International Truck Intellectual Property Company, L.L.C., Warrenville, IL (US)

(*) Notice: Subject to any disclaimer, the term of this patent is extended or adjusted under 35 U.S.C. 154(b) by 0 days.

(21) Appl. No.: 09/989,581

(22) Filed: Nov. 20, 2001

Related U.S. Application Data

(62) Division of application No. 09/434,671, filed on Nov. 5, 1999, now Pat. No. 6,356,822.

(60) Provisional application No. 60/107,174, filed on Nov. 5, 1998.

(51) Int. Cl.[7] .......................... G01S 5/00; G01M 17/00

(52) U.S. Cl. ............................ 701/33; 701/24; 701/32; 701/34; 340/825.54; 340/825.52; 709/219

(58) Field of Search ............................ 701/33, 34, 30, 701/24, 29, 32; 340/438, 457, 825.54, 825.52, 827.06; 709/219

(56) References Cited

U.S. PATENT DOCUMENTS 5,931,878 A * 8/1999 Chapin, Jr. .................. 701/30

* cited by examiner

*Primary Examiner*—William A. Cuchlinski, Jr.
*Assistant Examiner*—Tuan C To
(74) *Attorney, Agent, or Firm*—Jeffrey P. Calfa; Neil T. Powell; Dennis Kelly Sullivan

(57) ABSTRACT

A communication system architecture (SA) for a vehicle which may be integrated into the vehicle's multiplexed electronic component communication system, and a process for communicating with the vehicle to provide information for and about the vehicle's operational status and coordinating the vehicle's activities. The communication system will include a multi-functional antenna system for the vehicle that will have the capability to receive AM/FM radio and television signals, and transmit and receive citizens band (CB) radio signals, satellite and microwave and cellular phone communications. The antenna may be installed as original equipment or as a back-fit part in the after-market. In either case the multi-functional antenna will be integrated with the vehicle's multiplexed electronic component communication system. The process for communicating with the vehicle will involve a communication service for which the vehicle's driver will enroll for and service will continue so long as maintenance fees are paid. The service will be capable of providing various levels of information transfer and coordination. The levels may include vehicle information such as (1) the need for servicing and location of the nearest service center with the necessary parts in stock, (2) routing, and (3) load brokering and coordination. The modular design of the system architecture (SA) will allow it to be employed with the vehicle platform that does not possess a full multiplexed electronic component communications system. The resulting vehicle, using an after-market application package, will be able to participate in some of the services.

1 Claim, 22 Drawing Sheets

PROCESS FOR AN OFF BOARD COMMUNICATION NETWORK FOR DETECTING AND CORRECTING A FAULT IN A MOBILE VEHICLE. PAGE 2 OF 2

LAND VEHICLE COMMUNICATIONS SYSTEM AND PROCESS FOR PROVIDING INFORMATION AND COORDINATING VEHICLE ACTIVITIES

This application is a division of Ser. No 09/434,671 Nov. 5, 1999, U.S. Pat. No. 6,356,822 which claims benefit of Ser. No. 60/107,174 Nov. 5, 1998.

BACKGROUND OF THE INVENTION

This invention relates to a communication system architecture (SA) for a vehicle which may be integrated into the vehicle's multiplexed electronic component communication system, and a process for communicating with the vehicle to provide information for and about the vehicle's operational status and coordinating the vehicle's activities. The system architecture includes an off board communication network. The communication system will include a multi-functional antenna system for the vehicle that will have the capability to receive AM/FM radio and video signals, and transmit and receive citizens band (CB) radio signals, short range radio frequency, satellite and microwave and cellular phone communications. The antenna may be installed as original equipment or as a back-fit part in the after-market. In either case the multi-functional antenna will be integrated with the vehicle's multiplexed electronic component communication system. The process for communicating with the vehicle will involve a communication service for which the vehicle's driver will enroll for and service will continue so long as maintenance fees are paid. The service will be capable of providing various levels of information transfer and coordination. The levels may include vehicle information such as (1) the need for servicing and location of the nearest service center with the necessary parts in stock, (2) routing, and (3) load brokering and coordination. The modular design of the system architecture (SA) will allow it to be employed with the vehicle platform which does not possess a full multiplexed electronic component communications system. The resulting vehicle, using an aftermarket application package, will be able to participate in some of the services.

PRIOR ART

Vehicle communication systems have been described before in the prior art. These systems in some cases related to vehicle maintenance and service. None of them took a direct feed of vehicle status from the vehicle internal communication system. Some of the prior art systems provided routing instructions. None of them used the concept of independent vehicles in a network as probes for information on driving condition status. None of the prior art coordinated vehicle load transfers of independent carriers to allow the independent day trip carriers to act in concert for long distance load transfers.

SUMMARY OF INVENTION

The invention is an intelligent information system architecture and process for commercial and other transportation vehicles that provides improved productivity, effectiveness, safety and other benefits. Moreover, the system architecture is tailored to the different businesses.

Commercial vehicles are tools for businesses. Like any tool, the commercial vehicle may be used in various applications depending on the businesses specific needs. All commercial vehicles require some kind of external information to enhance the use or performance of the vehicle. Of this information, some is generic to all businesses using commercial vehicles and some is specific to particular industries. The commercial vehicle platform required by this invention has an internal communication system with multiplexed electronic components using wireless as well as wired communications. Electronic components are communicated with and controlled through this network. Included among the electronic components is a multi-functional antenna system for the vehicle. The antenna(s) system will replace all current vehicle antennas such as CB, cellular, TV, and AM/FM/Weatherband radio, satellite, LORAN navigation, and other bands of the electromagnetic spectrum. The antenna(s) system may be installed as original factory equipment in the vehicle or as after market equipment. Also, included amongst the electronic equipment on the commercial vehicle platform are all the numerous speakers, microphones, and enunciators contained on the vehicle, and integrated into a modular integrated package.

The multiplexed system may gather the status of various operating parameters of the vehicle from the electronic components. The operating status of the vehicle may be uplinked through the multi-functional antenna system to one or more external communications control centers (ECCC). The ECCCs and the enrolled vehicle platforms generally comprise the communications system architecture (SA), although the SA is expected to include service and parts centers as well as weather, and routing and traffic tracking centers. There are three anticipated phases to implement the SA. They are:

1. Maintenance and Service
2. Routing and Trip Information
3. Business Specific Information/Coordination All phases involve at a minimum two way communication between the ECCC and the enrolled vehicle platforms. The vehicle platforms may be any mobile vehicle. Only medium and heavy duty trucks and people transportation buses are described for illustration here. Additional components or functions which may be included into the platform system by the use of software modules and/or hardware components which once installed in an electronic cabinet will integrate the additional functions into the multiplexed system. This installation will make use of standardized modules and interface components.

Phase One (1) involves the maintenance and servicing of the vehicle platforms. The internal multiplexing system of the vehicle platforms will interconnect all of the electronic components of the vehicle. As such the status of vehicle systems may be uplinked to the ECCC without driver intervention. The status will include, but is not limited to key engine parameters provided from the engine electronic control module, transmission controller, anti-lock brake (ABS) status from the ABS controller, and trailer load and installation status, as well as truck cargo and conditions. The status information is only limited as far as to electronic component inputs which may be provided. The ECCC will analyze the vehicle operating status and downlink information and instructions to the vehicle. The downlinked information will include maintenance needs of the vehicle. Such maintenance needs might include the need for immediate service. In this case the downlinked information will include the location of the nearest vehicle service center which has the parts in stock to effect the repairs. It will also include routing instructions to get to the nearest service center. Routing instructions will be discussed further below in the description of Phase Two (2) Routing and Trip Information. The multiplexed vehicle electronic controllers will be able to sense erratic operation of the vehicle using monitors on steering, engine, and brake components as well as the trailer status. Should the uplinked status indicate an erratic driving pattern, the ECCC will contact the driver directly recommending a break and if necessary contact the vehicle's owner and in a last case notify highway or police authorities to provide warnings. The vehicle platform may also be configured to provide immediate feedback directly to the operator based on the business needs of the owner.

The Phase 1 information is viewed as generic type information valuable to owners of all mobile vehicles with particular interest to commercial vehicle owners.

The multiplexed vehicle may include infrared heat sensing apparatus, among apparatus using other frequency ranges and pressure sensing devices, to detect animals, vehicles and other heat emitting objects during poor visibility or nighttime driving. This will include the ability to sense the range to objects being approached. The electronic controllers will provide the driver warnings of the status directly through the integrated speakers and will uplink the information to the ECCC so the animal crossings may be provided to enrolled vehicle platforms in the vicinity. The ECCC will use the vehicle platforms with their sensory inputs as probes to establish a real time picture of a particular region; thereby, augmenting the information provided by any one service.

Phase 2 involves routing and trip information for the enrolled vehicle platforms. At the drivers active request or upon regular intervals, the ECCC will provide routing information to the enrolled vehicles. The ECCC will have a running fix of the enrolled vehicles' locations. The routing information will allow the drivers of the vehicle platforms to choose and use the most efficient routes to transit. Prior art routing information included the best path based upon the shortest distance. Of course the shortest mileage is not necessarily the most efficient route. The ECCC will also have a geographic fix of devices and locations pertinent to the business and its needs. The ECCC upon sensing the uplinked location of the vehicle platforms will analyze the location of the vehicle. The ECCC will then collect input traffic information throughout the NAFTA countries (or other contiguous geographic regions) from Department of Transportation (DOT) repeaters (or international equivalent service), weather information from the National Weather Service (or international equivalent service) and other route effecting information from news services such as civil unrest or labor strife, as well as the shortest distance routing information. The traffic condition ECCC will then provide a cohesive route plan through electronic downlinking to the enrolled vehicle platforms with automatic updates upon the changing of the input information. Phase 2 routing information will be very useful in regional or line haul applications where a cohesive route plan means significant savings in operator costs and shipping expenses. Additionally, the routing information will be valuable for any business which has vehicles traveling in environments which are subject to rapidly changing conditions.

The school bus industry could utilize the varying downlinked routing plans during foul weather as well as providing instructions to substitute drivers unfamiliar with normal planned routes. The geographic reference information part of the routing information may be used to notify the operator and ECCC of both ideal and hazardous geographic zones.

The electric, gas, and telephone utility industry could use the routing information to direct work crews during response to foul weather or emergencies. In these situations, utilities are known to borrow crews and vehicles from utilities from other locations, sometimes from as far as thousands of miles away. Prior art vehicle tracking did not include visiting crew vehicles and coordination was not cohesive or well controlled. The ECCC can provide routing to these borrowed work crews and vehicles to coordinate response and the use of the vehicle as a tool for the business.

Municipal emergency vehicle small and large fleets could use the routing information to ensure that emergency vehicles such as police, fire, and ambulance vehicles may avoid obstacles such as traffic jams, bad weather, closed roads, open draw bridges, and the like. The ECCC input information will include the status of these intra-city and country obstructions to smooth passage and use this information to compute and downlink the most effective route to the emergency response vehicles. As with utility vehicles, some events or conditions require a response from out of area crews and vehicles. The ECCC routing and trip information will be invaluable to providing command and control of the out of area as well as local emergency vehicles and crews.

Phase Three (3) involves Business Specific Information/Coordination. For some business applications this will require the enrollment of vehicle platforms in various key locations throughout the participating countries. The general process involves gathering the locations of participating vehicles, evaluating the required tasks, and then directing the enrolled vehicle platforms to the locations to enhance the overall performance of the participating vehicles and organizations. Phase 3 will integrate the information transfers and controls of Phases 1 and 2 in that only vehicles which are in a proper operating status will be directed to be applied as tools for the desired functions, and in most cases routing directions will be required to fully coordinate diverse and far flung work crews or vehicles for work efforts.

In the utility area, for instance, the multiplexed vehicle platforms will also include electronic seat sensors or other occupant detection devices to monitor the manning levels of the response vehicles. This information will be uplinked by the multi-functional antenna system to provide manpower response estimates of the crews. The ECCC will track man hours worked in order to control overtime and ensure legal work hour requirements such as required in Department of Transportation (DOT) or Nuclear Regulatory Commission 10 C.F.R. 20 regulations are not exceeded. The electronic sensors in the multiplexed vehicle platform may also be used to track passenger entry and egress from buses. Information will be uplinked to record completed missions and to plan optimized pick-up locations.

The most far reaching application of Phase 3 business coordination is related to the regional and line haul trucking businesses. Phase 3 for these businesses involves a 'Pony Express' Service for transporting goods. Under this brokerage service vehicle owners or drivers will sign up to make deliveries within a geographic radius so that they may make transfers of goods (i.e. trailer loads) and enable them to return to their home each night. A 200–300 mile radius will allow a driver to make a pickup and transfer along a route to another driver in an adjacent 200–300 mile radius circle in order to move shipments of goods. In this way Phase 3 will allow regional day hauler tractor trailers to participate in a national or NAFTA or international transportation system while still sleeping in their own beds each night. It will allow small trucking entities to be more coordinated than large fleets due to the integration of vehicle operating status and routing under Phases 1 and 2. The integration of the independently owned multiplexed vehicle platforms will allow individual owners or small trucking firms to compete on an international level with minimum investment. Phase 3 implementation will need to be delayed until drivers with the overlapping work radii are enrolled in the Phase 1 and 2 services. Once the ECCC receives a request for a load transfer, it will contact the vehicle platforms within the most efficient transit path based upon the calculated Phase 2 routing analysis. Once the impacted drivers electronically agree to participate in the specific load transfer, the automatic routing information will commence with allowance for calculating rendezvous points. The load will be tracked using the Phase 1 service until completion of the journey. The load owner will be periodically automatically updated on delivery status if he or she so desires.

DRAWINGS

Other objects and advantages of the invention will become more apparent upon perusal of the detailed description thereof and upon inspection of the drawings, in which.

DETAILS OF INVENTION

Figure 1:
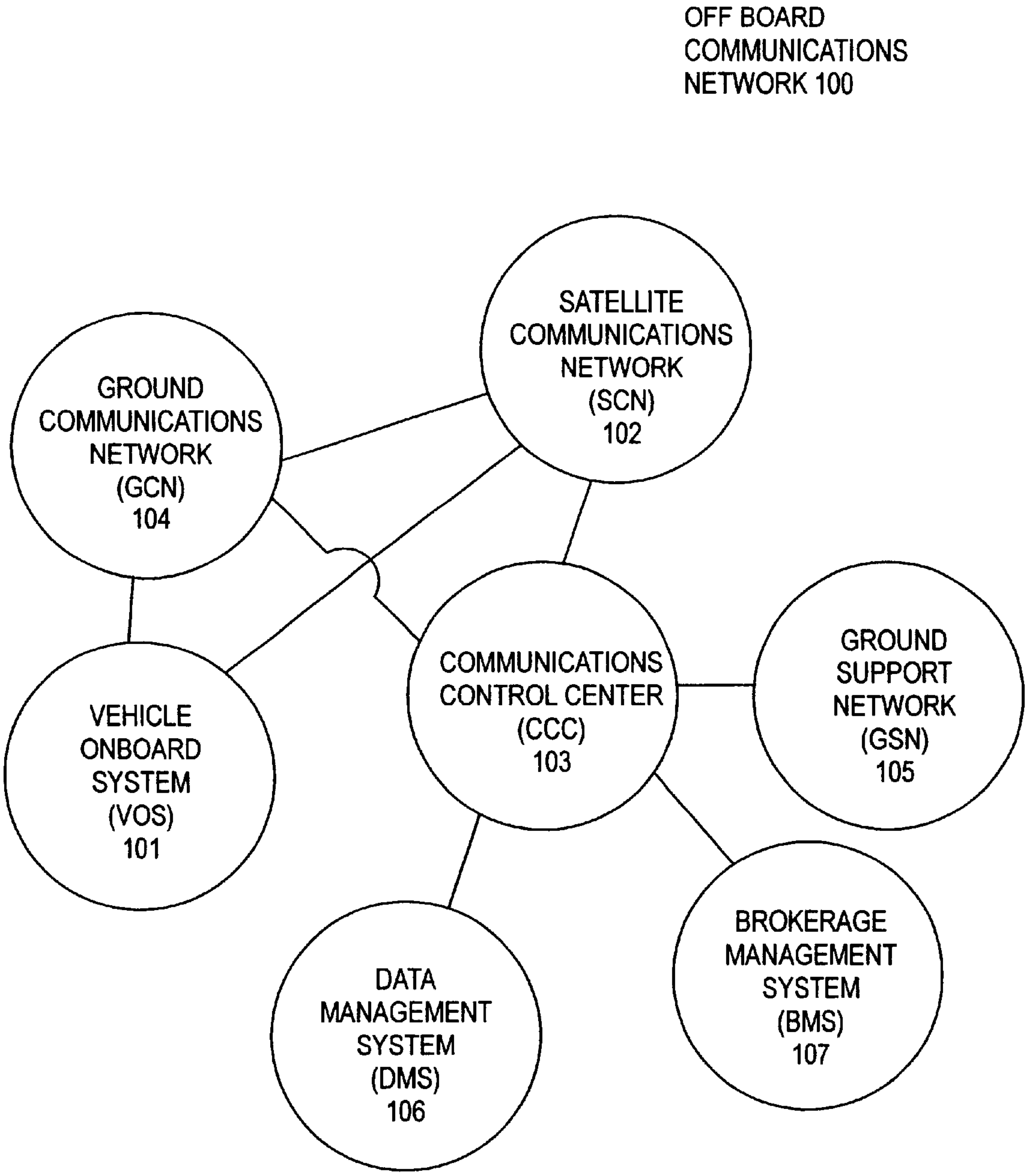
FIG. 1 is an overview drawing of a communication network for mobile vehicles made in accordance with this invention.

FIGS. 1 to 22 show a land vehicle communications system and process for providing information and coordinating vehicle activities. A land vehicle off board communication network 100 made in accordance with this invention may be comprised of any number of the subparts shown in FIG. 1. Both a centralized and de-centralized control scheme embodiment will be described. These subparts consist of: a Vehicle Onboard System (VOS) 101; a Satellite Communication Network (SCN) 102; a Communication Control Center (CCC) 103, short for the ECCC described earlier; a Ground Communication Network (GCN) 104; a Ground Support Network (GSN) 105; a Data Management System (DMS) 106; and a Brokerage Management System (BMS) 107. The minimum requirements for a vehicle communication network 100 are a VOS 101, a GSN 105, and either a SCN 102 or a GCN 104.

The VOS 101 serves two primary functions. The first is to provide information and requests to the CCC 103 through either the SCN 102 or the land based GCN 104. This information and these requests result in commands, queries, directions, and recommendations back from the CCC 103. The second primary function of the VOS 101 is to act as a mobile sensor platform for the CCC 103 and the DMS 106. The mobile sensor steps and components of the VOS 101 will be discussed below.

The SCN 102 and the GCN 104 may generally described as off board communication networks. In the decentralized embodiment of the invention, the GCN 104 may be integral to and carry on all the functions of the CCC 103. The SCN 102 is a network of one or more satellites which provide remote communication to, from, and between a mobile vehicle 111 that includes a VOS 101 and the other applicable subparts of the vehicle communication network 100. The SCN 102 will be a conventional network known in the art. The use of the network for transfer of VOS 101 as a sensor information and vehicle load management by the BMS 107 is new.

The GCN 104 is a network on the ground that may consist of any combination of telephones, RF transponders, radio, cellular phones, and the internet. The GCN 104 will be a conventional network known in the art. The use of the network for transfer of VOS 101 as a sensor information and vehicle load management by the BMS 107 is new.

The CCC 103, required only in the centralized control embodiment of the invention, analyzes input and requests from the other subparts and issues requests, directions, and recommendations to the other subparts. The CCC 103 will embody a single organization or several working in concert to analyze problems and needs and come up with solutions. The CCC 103 may include the DMS 106 although the DMS 106 may be a separate data system. The DMS 106 will collect and collate information from various sources that will include external conditions that may impact the vehicles 111. The incoming information may be from the VOS 101 as a sensor and as a monitored vehicle 100, the Department of Transportation traffic reports, the National Weather Service, news sources such as the Cable News Network (CNN) or the Associated Press, and road map direction generating systems such as those commercially available. This listing is not exclusive.

The GSN 105 is comprised of a network of vehicle support facilities that may include parts warehouses, vehicle service and maintenance centers, information services (a.k.a. 'help desk') and road service providers such as tow trucks or wreckers. The GSN 105 will provide parts and service as necessary to return or maintain a mobile vehicle in service. It may include vehicle dealers and independent service and parts providers.

The BMS 107 provides two primary functions. The first function is to provide shippers of goods and materials a single point of contact to electronically arrange shipments of materials by both tractor-trailer and smaller vehicles. The loads may include straight truck applications and also people for bus transportation. The BMS 107 takes the shipping request and will then determine the route through the DMS 106. The BMS 107 will then contact member Vehicle 111s, determine availability and economics of the associated Vehicle 111s, contact the Vehicle 111s to offer and arrange the necessary vehicle 111s along the shipment route, and make arrangements for rendezvous and load transfers to implement the transfer. The BMS 107 will contact out of network carriers as necessary to arrange the shipment. The BMS 107 will monitor and receive VOS 101 reports on the road and vehicle conditions and make changes to the route or carriers as necessary to effect the shipment order. The second function of the BMS 107 is to provide the owners and drivers of Vehicles 111 electronic brokerage services. The owners or drivers of the vehicles, usually in the Class 5 to 8 as determined by the Gross Vehicle Weight (GVW), will sign up the vehicle for the load brokerage service. The BMS 107 will contact available vehicles 111 or their owners with potential haulage opportunities and provide instructions to the vehicle as far as rendezvous, load transfers, and routing. In at least one embodiment, the BMS 107 will be integral to the CCC 103.

Figure 2:
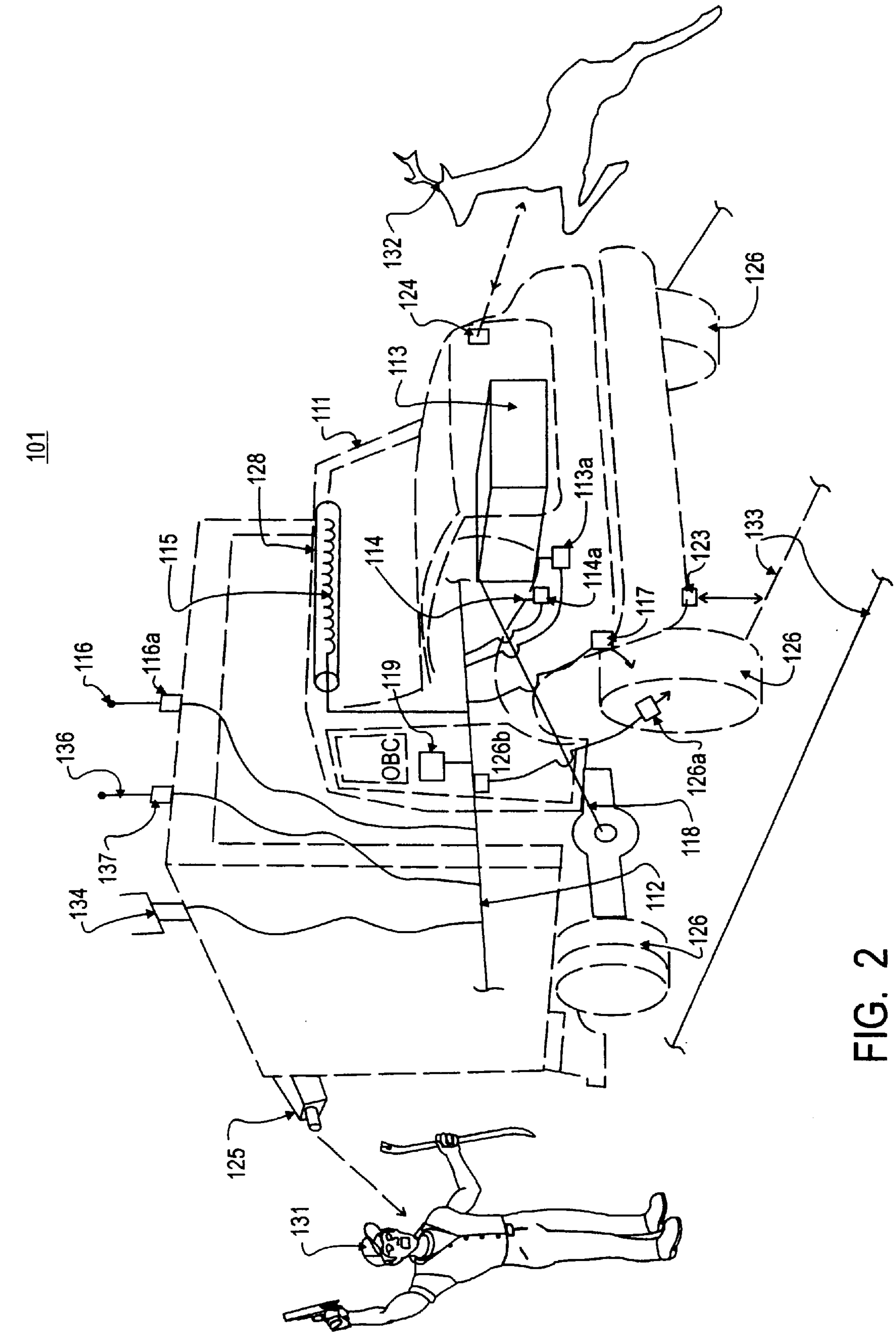
FIG. 2 is a perspective of a mobile vehicle made in accordance with this invention.

The VOS 101 may include as complex as a multiplexed vehicle system that includes an internal communication backbone 112 allowing communication between electronic components using standards and communication protocols such as the Society of Automotive Engineers (SAE) J1708, J1587, J1939 communication protocols or a like proprietary variant. The communication backbone 112 may be as simple as a loose network of sensors and components connected in a point-to-point fashion. The more complex version is shown in FIG. 2. The internal electrical communication backbone 112 is electrically engaged to provide a communication path between various electronic devices and controllers as part of the VOS 101. The vehicle 111 has an engine 113 engaged to a transmission 114. The transmission is engaged to a drive train 118 for driving the wheels 126. The engine 113 is controlled and monitored by an engine electronic control module (ECM) 113*a* that is electrically engaged to the communication backbone 112. The engine ECM 113*a* may receive and communicate status of the engine and auxiliaries including but not limited to engine performance, engine coolant parameters, engine oil system parameters, air intake quality, and other monitored parameters. The transmission 114 if automatic or semi-automatic may be controlled and monitored by a transmission electronic control module 114*a* that is electrically engaged to the communication backbone 112. The vehicle 111 may have an onboard computer (OBC) 119 which if present will be the lead message arbitrator or lead controller for the vehicle 111. The OBC 119 will collect input and send requests from and to the CCC 103 through an onboard communications means and either the SCN 102 or the GCN 104. The OBC 119 will act as a lead message arbitrator or lead controller, whose orders in conflict with other controllers will countermand. If the vehicle 111 does not have an OBC 119, then another ECM such as the engine ECM 113*a* will act as the lead controller. The onboard communication means may be a satellite access antenna 115 that may be included in a sun visor 128 or a cellular phone antenna 116 with a phone transceiver 116*a*. The communication means may additionally be any vehicle to land method and equipment. The wheels 126 may include anti-lock (ABS) brakes. The anti-lock brakes may be controlled by an anti-lock brake electronic control module (ABS ECM) 117. The ABS ECM 117 is electrically engaged to the communication backbone 112 and like the other ECMs provides status of the system to the OBC 119 or other lead controller and hence to the CCC 103 through the onboard communication means. The onboard communication means provides input of its own system operability to the OBC 119 or other lead controller. A tire pressure sensor 126*a* is mounted on each wheel. The tire pressure sensor 126*a* measures each tires pressure and sends radio signal to a receiver 126*b* that is electrically engaged to the communication backbone 112. Tire pressure is an indicator of tire wear, the need for a pressure adjustment, or vehicle loading depending on the pressure distribution across the tires and a specific vehicle history maintained by either the OBC 119 or the DMS 106 remotely. An electronic odometer may also be tied to the communication backbone 112 provide input of miles traveled to the OBC 119, other lead controller, and the CCC 103 remotely. A navigation system such as those based on GPS and Dead Reckoning may be installed and engaged to the communication backbone 112 with an appropriate antenna 136 and transceiver 137 for providing input of the vehicle 111's geographic position. The above mentioned ECMs and sensors are examples of specific vehicle inputs providing a specific vehicle status.

Other sensors on the vehicle 111 provide the VOS 101 with indications of external conditions that may be valuable to other vehicles tied to the communication network 100. Some examples include a road ice sensor 123. The road ice sensor 123 can be a simple as an infrared transceiver directed downwards to a road surface 133. Road surfaces 133 with ice, snow, black ice, or water, or dry will give different infrared reflective signals back to the road ice transceiver 123. The road ice transceiver 123 is also electrically engaged to the communication backbone 112. The vehicle 111 may include an infrared animal detector 124 tied to the communication backbone 112. The infrared animal detector 124 detects large animals crossing the road such as elk, moose, or deer. In addition to providing the driver with a warning message or alarm, the VOS 101 will provide the information to the DMS 106 externally. This information will be logged and provided to other drivers entering the vicinity of the vehicle 111 acting as an animal crossing detector. The vehicle may also have an external security camera 125 for detecting thieves, high-jackers or other threats 131 to the driver or his load. The CCC 103 may notify the local police or private security firms upon receiving transmission of a crime in progress. The VOS 101 may also include local weather monitors 134 tied to the communication backbone 112. The local weather monitors 134 can include temperature, wind speed, and humidity. This information will provide the DMS 106 with validation and confirmation of National Weather Service information.

The lead message arbitrator or lead electronic controller may be programmed for communication with the off board communication network through the communication means engaged to the internal communication backbone 112. The lead electronic controller is also programmed for transmitting an indication of an abnormal condition in one of the monitored vehicle components to the off board communication network 100 through the vehicle internal communication backbone 112 and the communication means. The lead electronic controller may be programmed for receiving instructions for action to address the abnormal condition from the off board network 100 through the communication means. The lead electronic controller may also be programmed for notifying a driver of the vehicle 111 of driver actions of the received instructions from the off board network 100.

The lead message arbitrator or lead electronic controller may also be programmed for receiving a query for additional information from the off board network 100 related to the abnormal condition. The lead controller may be programmed for obtaining the additional queried information about the abnormal condition through the internal communication backbone without driver intervention. The lead controller may be programmed for transmitting the additional queried information to the off board communication network through the vehicle internal communication backbone 112 and the communication means without driver intervention.

The instructions the lead electronic controller is programmed for receiving for action to address the abnormal condition from the off board network may include a closest location of the repair parts to correct the abnormal condition and directions to the closest location. Additionally, the indication of an abnormal condition the lead electronic controller is programmed for monitoring may be monitored through either the engine ECM 113*a*, the transmission ECM 114*a*, anti-lock brake ECM 117, or the OBC 119.

Figure 19:
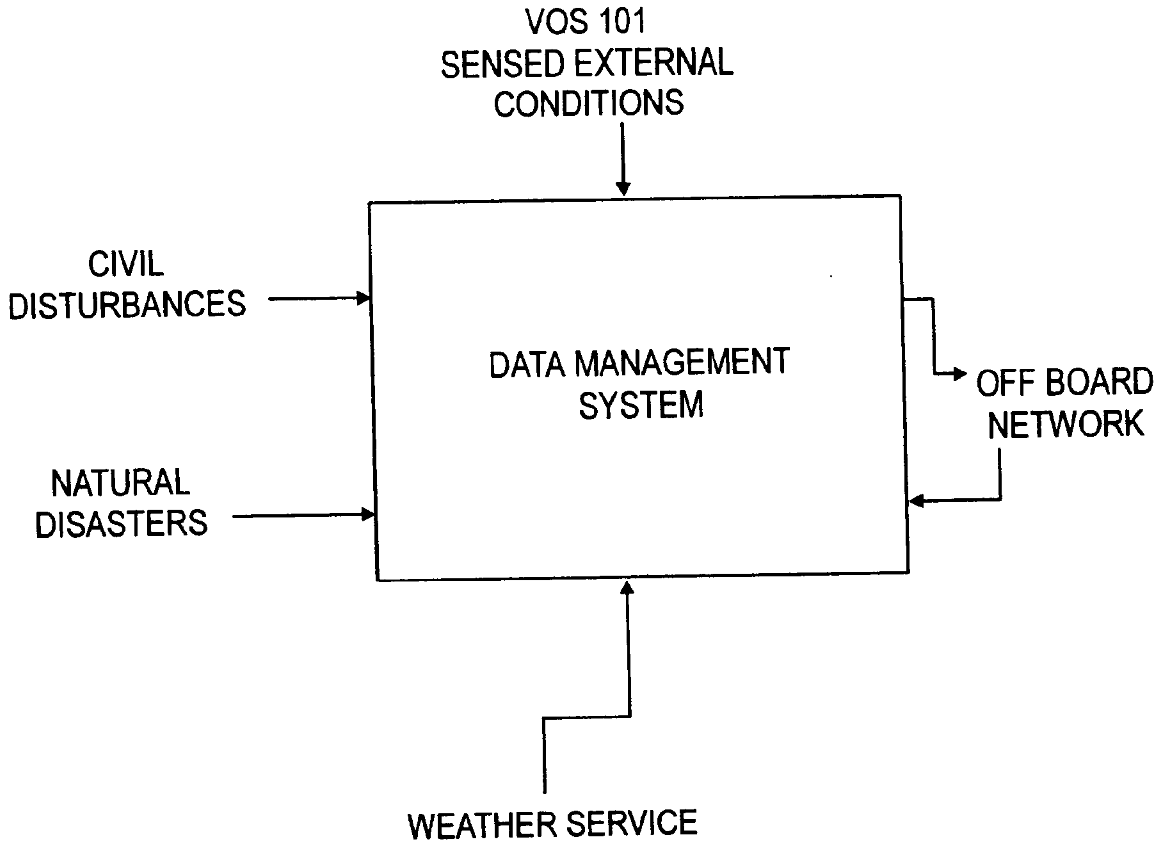
FIG. 19 is a data management system for coordinating information related to external conditions that may impact a network of mobile vehicles made in accordance with this invention.

One embodiment of the data management system is shown in FIG. 19. The data management system 106 may be integral to the communications control center in a centralized control scheme. The embodiment shown in FIG. 19 is for control of network vehicles as a result of external conditions which include external conditions sensed by Vehicle onboard systems 101. The embodiment of FIG. 19 is comprised of a computer useable medium having computer readable program means embodied in the medium for causing storage of network vehicle sensed conditions. The vehicle sensed conditions are communicated through the communication means engaged to the internal communication network 112 of the sensing network vehicles. For this embodiment, the vehicle sensed conditions are in environments that may impact at least one of the network vehicles. Additionally, the data management system 106 has computer readable program means for causing communication with weather information in environments which may impact at least one of the network vehicles from a weather service. In this embodiment, there is also a computer readable program means for causing communication querying for and reception of information on a civil disturbance in environments which may impact at least one of the network vehicles. The data management system 106 has computer readable program means for causing communication with, reception of, and response to queries on the vehicle sensed conditions, weather information, civil disturbances.

The off board network 100 may be utilized for a number of processes involving different combinations of Vehicles 111 with Vehicle onboard systems (VOSs) 101; the satellite communications network (SCN) 102; a communications control center (CCC) 103, the ground communications network (GCN) 104; the ground support network (GSN) 105; a data management system (DMS) 106; and the brokerage management system (BMS) 107.

Figure 3:
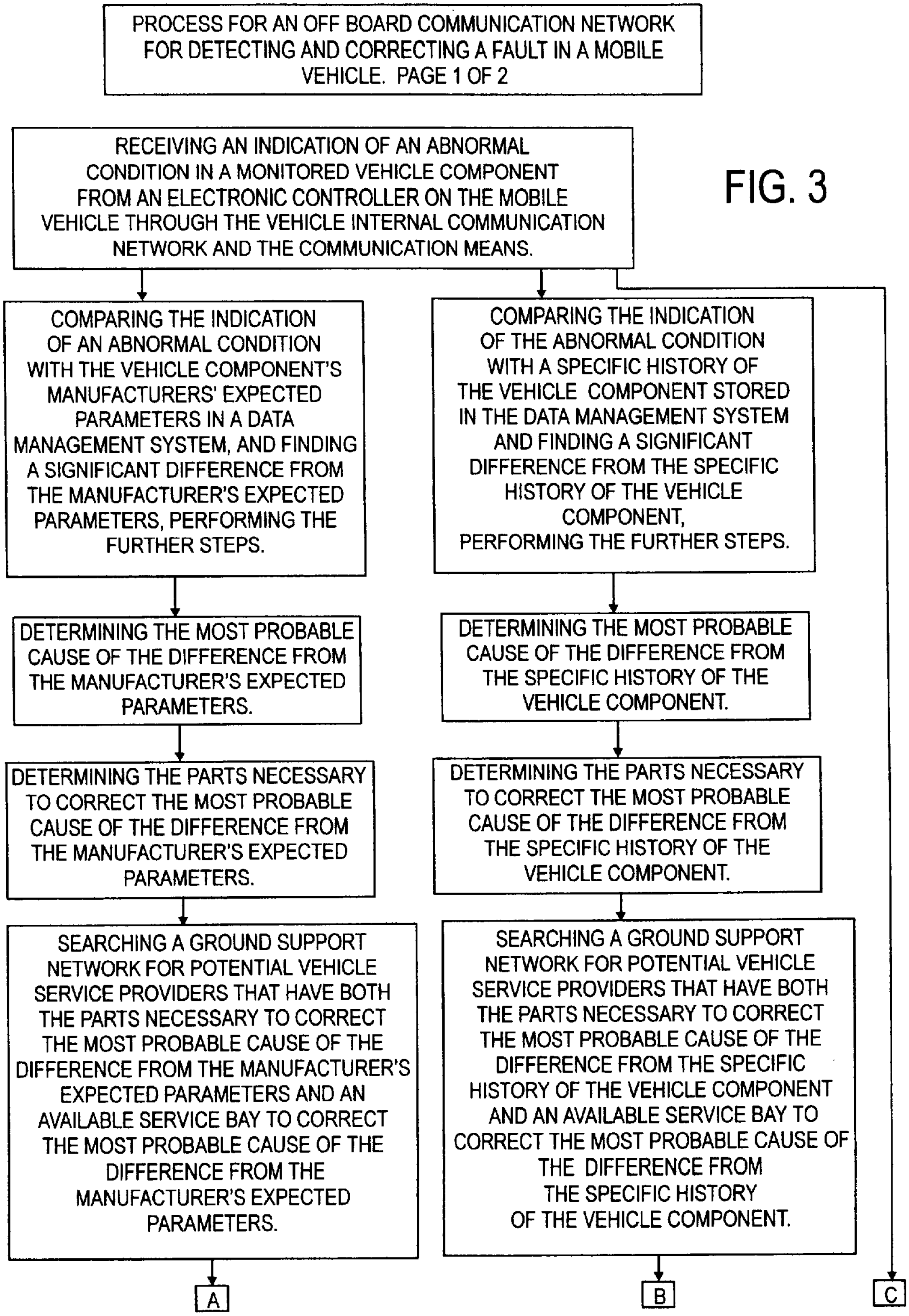
FIG. 3 is page 1 of a process for an off board communication network for detecting and correcting a fault in a mobile vehicle made in accordance with this invention.
Figure 4:
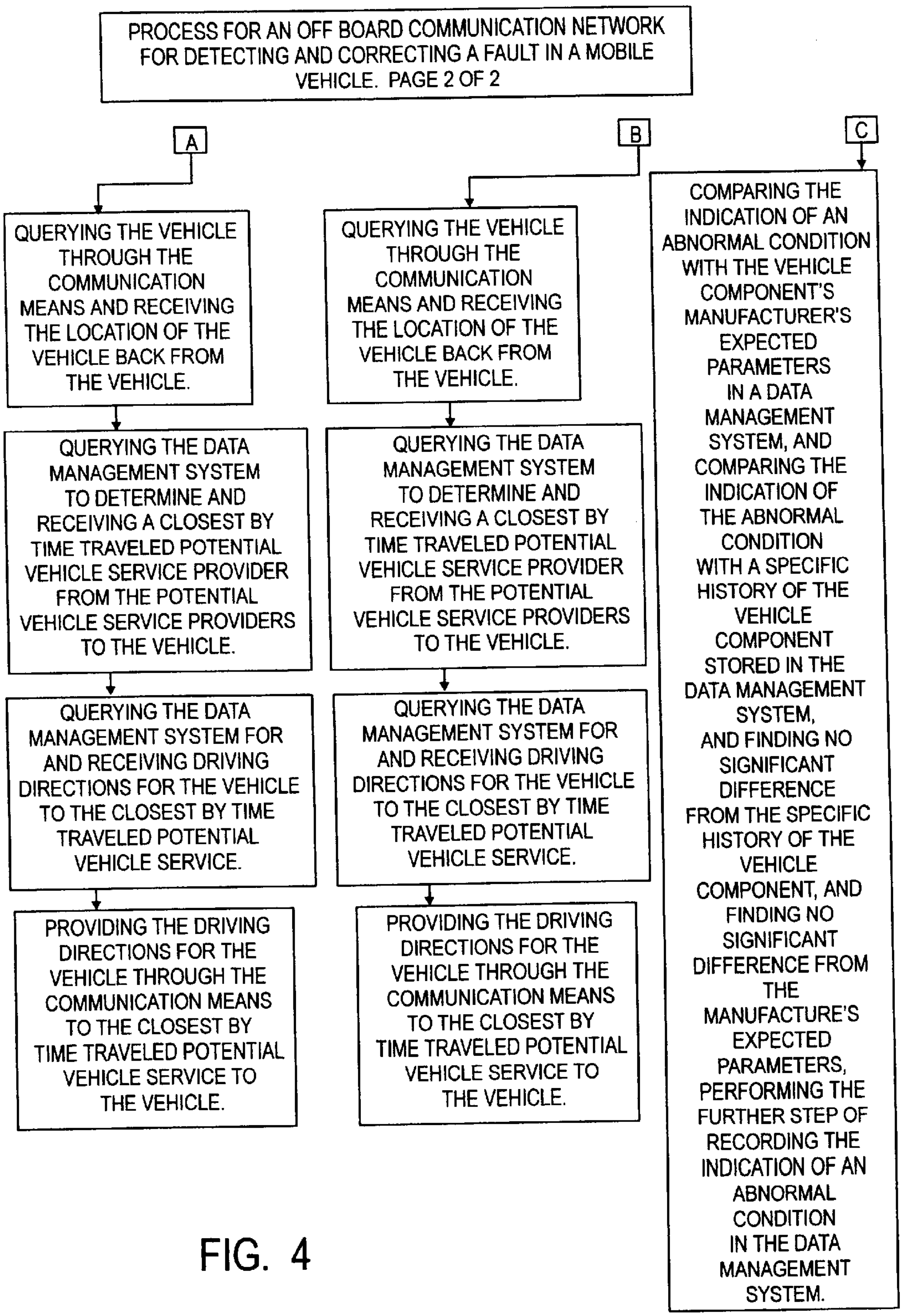
FIG. 4 is page 2 of the process of FIG. 3.

A first process for the off board communication network 100 is for detecting and correcting a fault in a mobile vehicle 111 with a VOS 101 is shown in FIGS. 3 and 4. This process may be performed by a centralized entity or the subparts performed by a combination of entities. One embodiment of this process has a first step of the off board network 100 receiving an indication of an abnormal condition in a monitored vehicle 111 component from an electronic controller on the mobile vehicle 111 through the vehicle internal communication network 112 and the communication means. The next step is comparing the indication of an abnormal condition with the vehicle component's manufacturers' expected parameters in the data management system 106. If there is a significant difference from the manufacturer's expected parameters, then the following steps are performed. Next the most probable cause of the difference from the manufacturer's expected parameters is determined using a comparison to an existing fault chart or by live engineering personnel. The next step is determining the parts necessary to correct the most probable cause of the difference from the manufacturer's expected parameters. This also is obtained from fault charts or by live personnel. The ground support network 105 is searched for potential vehicle service providers that have both the parts necessary and an available service bay to correct the most probable cause of the difference from the manufacturer's expected parameters. The vehicle 111 is queried and responds through the communication means with the location of the vehicle. The off board network 100 queries the data management system 106 to determine a closest by time traveled potential vehicle service provider from the potential vehicle service providers to the vehicle 111. The off board network 100 queries the data management system 106 for and receives driving directions for the vehicle 111 to the closest by time traveled potential vehicle service. The off board network 100 provides the driving directions for the vehicle 111 through the communication means to the closest by time traveled potential vehicle service to the vehicle.

Should there not be a significant difference between the abnormal condition and the manufacturer's expected parameters, the off board network 100 compares the indication of the abnormal condition with a specific history of the vehicle component stored in the data management system. Should there be a finding of a significant difference from the specific history of the vehicle component, the off board network 100 performs the following steps. The off board network 100 determines the most probable cause of the difference from the specific history of the vehicle component using a comparison to an existing fault chart or by live engineering personnel. The next step is determining the parts necessary to correct the most probable cause of the difference from the specific history of the vehicle component. This also is obtained from fault charts, other types of diagnostic procedures, or by live personnel. The off board network 100 searches a ground support network 105 for potential vehicle service providers that have both the parts necessary and an available service bay to correct the most probable cause of the difference from the specific history of the vehicle component. The vehicle 111 is queried and responds through the communication means with the location of the vehicle. The off board network 100 queries the data management system 106 to determine a closest by time traveled potential vehicle service provider from the potential vehicle service providers to the vehicle 111. The off board network 100 queries the data management system 106 for and receives driving directions for the vehicle 111 to the closest by time traveled potential vehicle service. The off board network 100 provides the driving directions for the vehicle 111 through the communication means to the closest by time traveled potential vehicle service to the vehicle.

If the off board network 100 compares the indication of an abnormal condition with the vehicle component's manufacturers' expected parameters, and with a specific history of the vehicle component stored and finds no significant difference, the off board network 100 performs the step of recording the indication of an abnormal condition in the data management system.

Additional steps to this process of FIGS. 3 and 4 may include transmitting a notice to the vehicle for a driver of the vehicle 111. The notice may include of the most probable cause of the difference from the manufacturer's expected parameters. This notice could be before the step of providing the driving directions for the vehicle 111 to the closest by time traveled potential vehicle service to the vehicle for both situations requiring action beyond mere recording of the condition.

Additionally, following the step querying the data management system for and receiving driving directions for the vehicle to the closest by time traveled potential vehicle service, the additional off board network 100 may perform the following steps. The network 100 will query the data management system 106 for any cargo being transported by the vehicle 111. The network 100 will arrange an alternative vehicle to transport the cargo and arrange a rendezvous between the vehicle 101 and the alternative vehicle to transfer the cargo. The step of arranging an alternative vehicle may include providing the brokerage management system 107 with a description of the cargo, a current location of the cargo, and a final destination of the cargo. The brokerage management system may communicate to and the network 100 may receive identifying information of an alternative vehicle to transport the cargo.

The off board network 100 may further arrange the cargo transfer rendezvous by querying and receiving a location of the alternative vehicle. The network 100 may query the data management system 106 for and receive driving directions for the alternative vehicle for the fastest by time traveled route to rendezvous with the vehicle 111 to transfer the cargo. The off board network 100 then may transmit the fastest by time traveled route to rendezvous with the vehicle to transfer the cargo to the alternative vehicle. Also the network 100 may transmit the cargo transfer rendezvous information to the vehicle.

Figure 5:
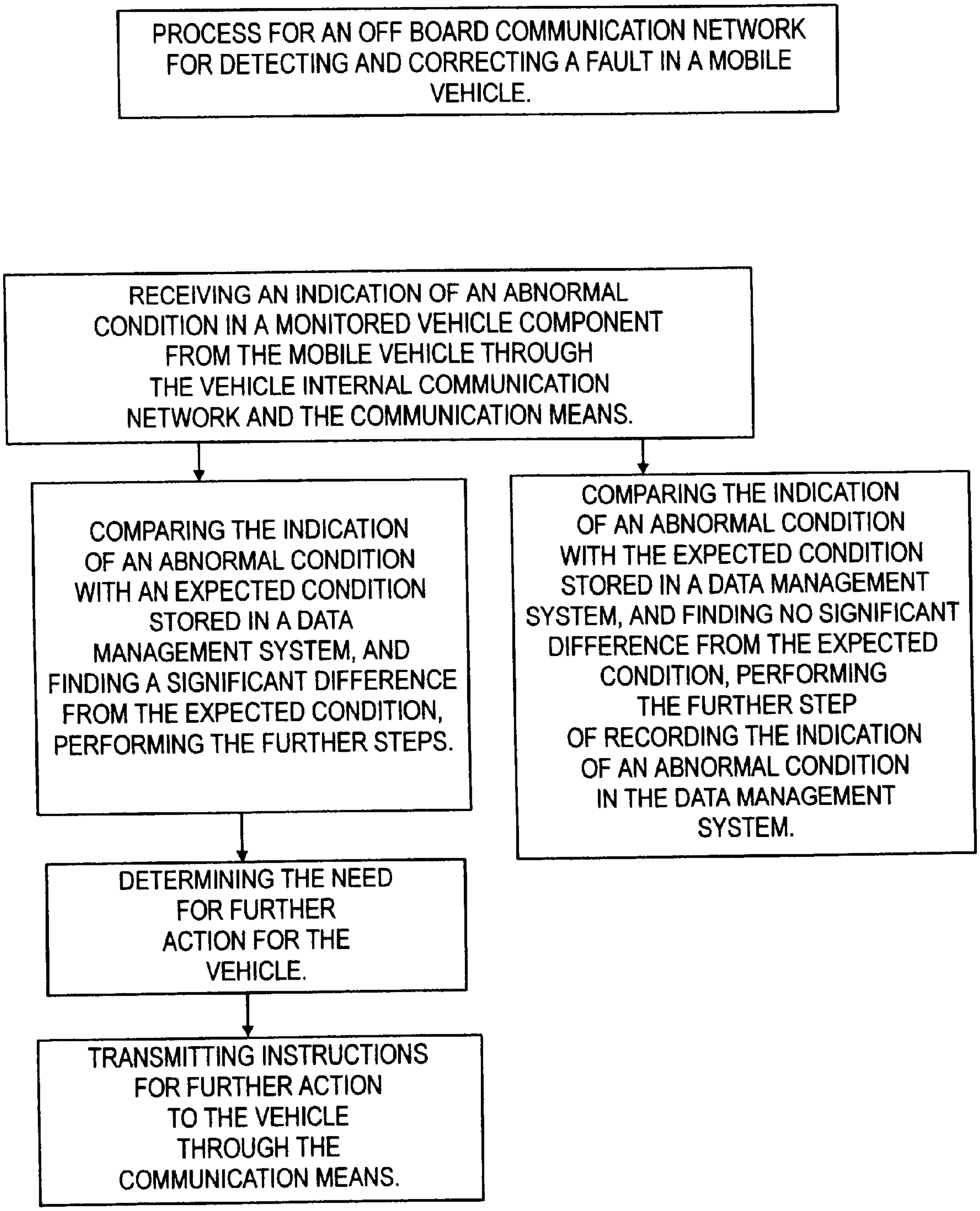
FIG. 5 is another embodiment of a process for an off board communication network for detecting and correcting a fault in a mobile vehicle made in accordance with this invention.

An additional process embodiment may provide more flexibility in addressing other abnormal conditions in the vehicle 111. This process also may be performed by a centralized entity or by a group of entities acting in concert. The first step of this embodiment, shown in FIG. 5 is receiving an indication of an abnormal condition in a monitored vehicle component from the mobile vehicle 111 through the vehicle internal communication network 112 and the communication means. Then there is a comparison of the indication of an abnormal condition with an expected condition stored in a data management system 106. Should there be a finding of a significant difference from the expected condition, then the need for further action is determined. Instructions for further action are transmitted to the vehicle through the communication means. Should the comparison of the indication of an abnormal condition with the expected condition stored in a data management system find no significant difference from the expected condition, then the indication of an abnormal condition in the data management system is recorded.

Figure 6:
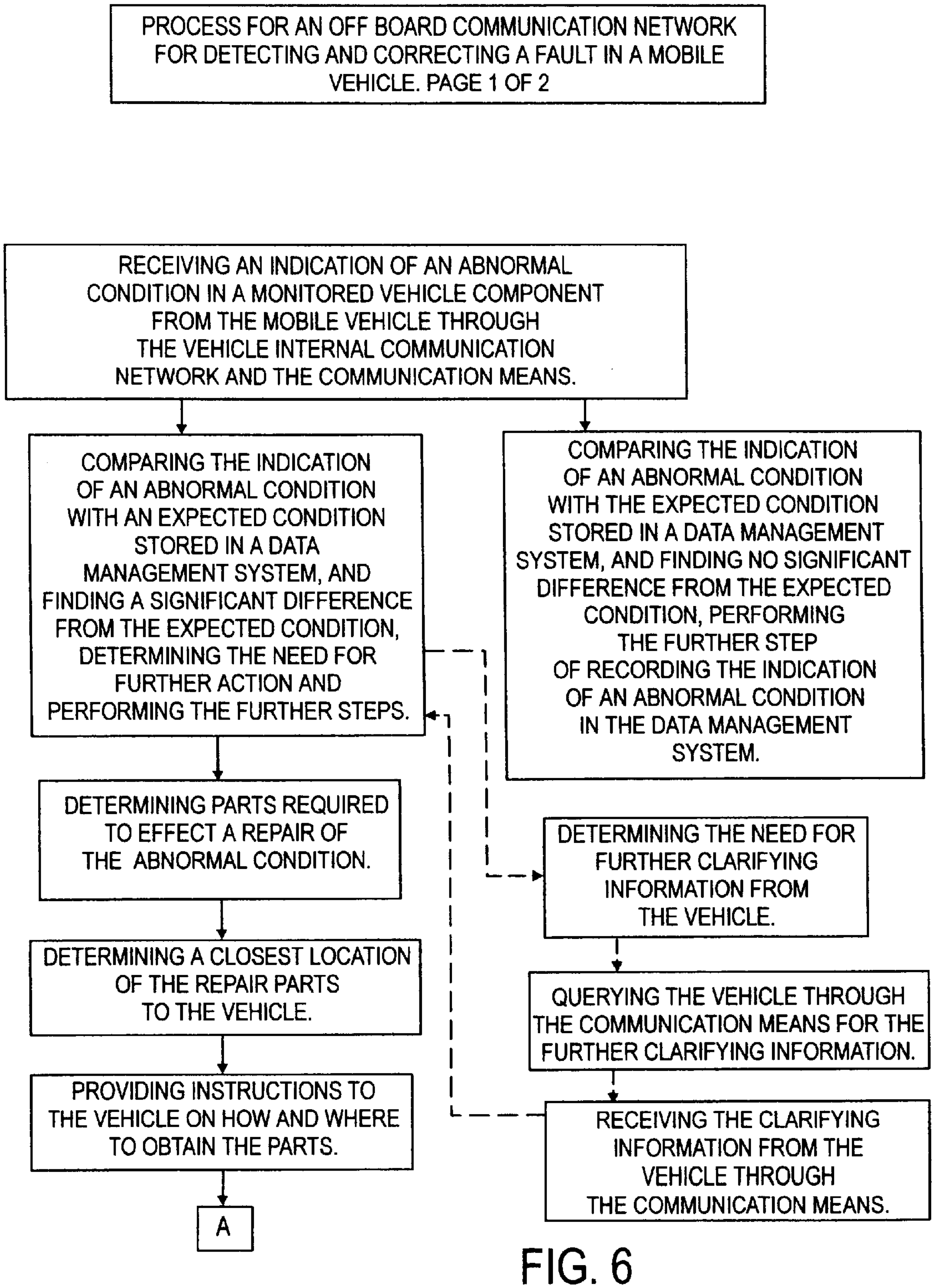
FIG. 6 is page 1 of a further embodiment of the process of FIG. 5.
Figure 7:
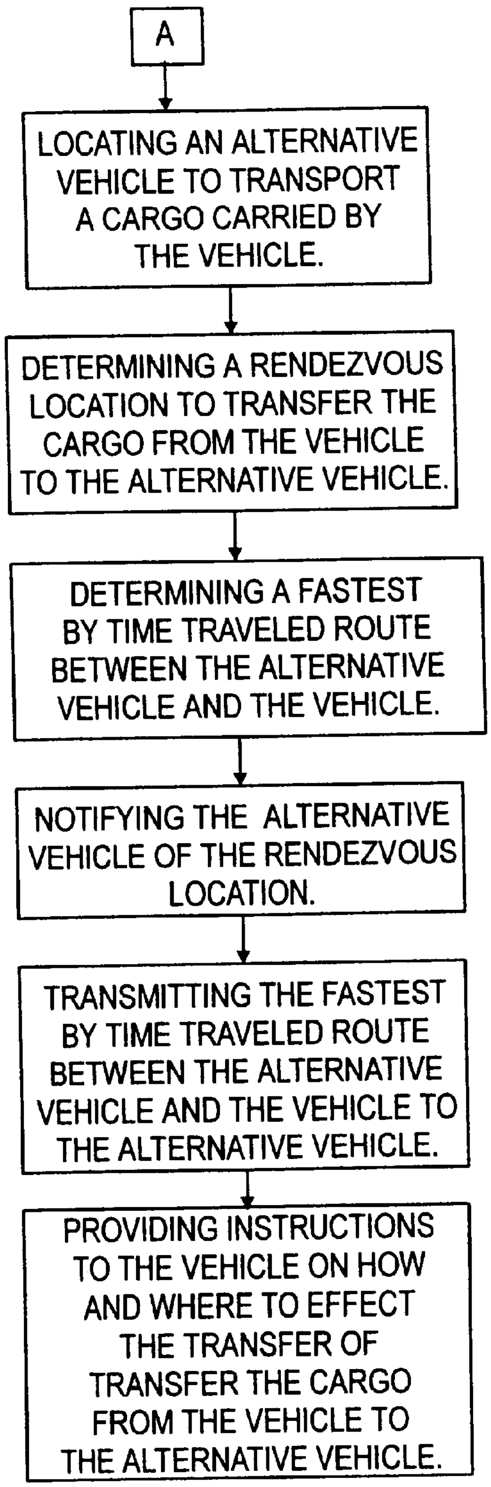
FIG. 7 is page 2 of the process of FIG. 6.

FIGS. 6 and 7 show a further embodiment of the process of FIG. 5. This further embodiment includes additional actions in regards to determining further action and transmitting instructions in related to that further action. These additional actions were described above for the process shown in FIGS. 3 and 4. The abnormal conditions identified by the vehicle 111 may be initially processed by the engine ECM 113*a*, the transmission ECM 114*a*, or the antilock braking ECM 117 or the Onboard Computer 119. The network 100 may determine the need for further information. The vehicle may need to be queried for additional information with the vehicle 111 providing such information.

The data management system 106 performs some processes alone, although as mentioned above the data management system may be integral to the communications control center 100. One of these data management system processes is inherently shown in FIGS. 3 and 4. The first step of this process is storing a vehicle component's manufacturers' expected parameters and a specific history of the vehicle components. The data management system 106 may receive a query from the off board network 100 for the manufacturer's expected parameters for the vehicle or for the specific history of the vehicle components. The data management system 106 then provides the off board network 100 with the stored information for comparison of to an indication of an abnormal condition. All along the data management system stores a listing of most probable causes of differences from the comparison information parameters. Upon the off board network 100 finding a significant difference from the comparison information parameters, the data management system 106 may receive a query for and subsequently provide the off board network 100 with listing of most probable causes of differences from the comparison parameters. The off board network 100 would compare the abnormal condition to this cause-condition reference listing to determine a match between a most probable cause and the abnormal condition. The data management system 106 stores independent listings of vehicle parts necessary to correct each of the most probable causes of differences from comparison parameters. Upon receiving a query for parts listings, the data management system 106 provides the off board network independent listings of vehicle parts necessary to correct each of the most probable causes. This allows the off board network 100 to determine the parts necessary to correct the most probable cause of the difference from the comparison parameters. The data management system 106 may receive a query from the off board network 100 to determine a closest by time traveled potential vehicle service provider from a listing of potential vehicle service providers that has both the parts necessary and an available service bay to correct the most probable cause of the abnormal condition. The data management system 106 may access a data base to determine driving times from potential vehicle service providers to the vehicle from the listing of potential vehicle service providers that have both the parts necessary to correct the most probable cause of the difference from the manufacturer's expected parameters and an available service bay to correct the most probable cause of the abnormal condition. The data management system 106 may choose a closest by time traveled potential vehicle service provider and provide identifying information about this provider to the off board network. The data management system 106 may receive a query from the off board network 100 for driving directions for the vehicle to the closest by time traveled potential vehicle service. The data management system 106 may access a data base to determine the driving directions for the vehicle 111 through the communication means to the closest by time traveled potential vehicle service to the vehicle. The data management system 106 will then provide the driving directions to the off board network 100. Should there not be a significant difference between the abnormal condition and the manufacturer's expected parameters or the specific component history, the data management system 106 will store a record of the abnormal condition.

This process for the data management system 106 may additionally consist of storing a record of cargo being carried by the vehicle 111 needing service. Upon receiving a query from the off board network 100 for any cargo being transported by the vehicle, data management system 106 will transmit a record of the cargo to the off board network 100. If the off board network 100 determines that an alternative vehicle may need to take a transfer of the cargo, the data management system 106 may receive a location of an alternative vehicle to transport the cargo carried by the vehicle needing service. Additionally, the data management system 106 may receive a status of the mobility of the vehicle 111 needing service. The data management system 106 may receive a query from the off board network 100 for a fastest by time traveled from the alternative vehicle to a rendezvous location with the vehicle needing service. The data management system 106 will in this situation access a data base to determine the driving directions for the alternative vehicle to the fastest by time traveled from the alternative vehicle to a rendezvous location with the vehicle needing service. The data management system 106 would then provide the alternative vehicle driving directions to the off board network 100 to the rendezvous.

Figure 8:
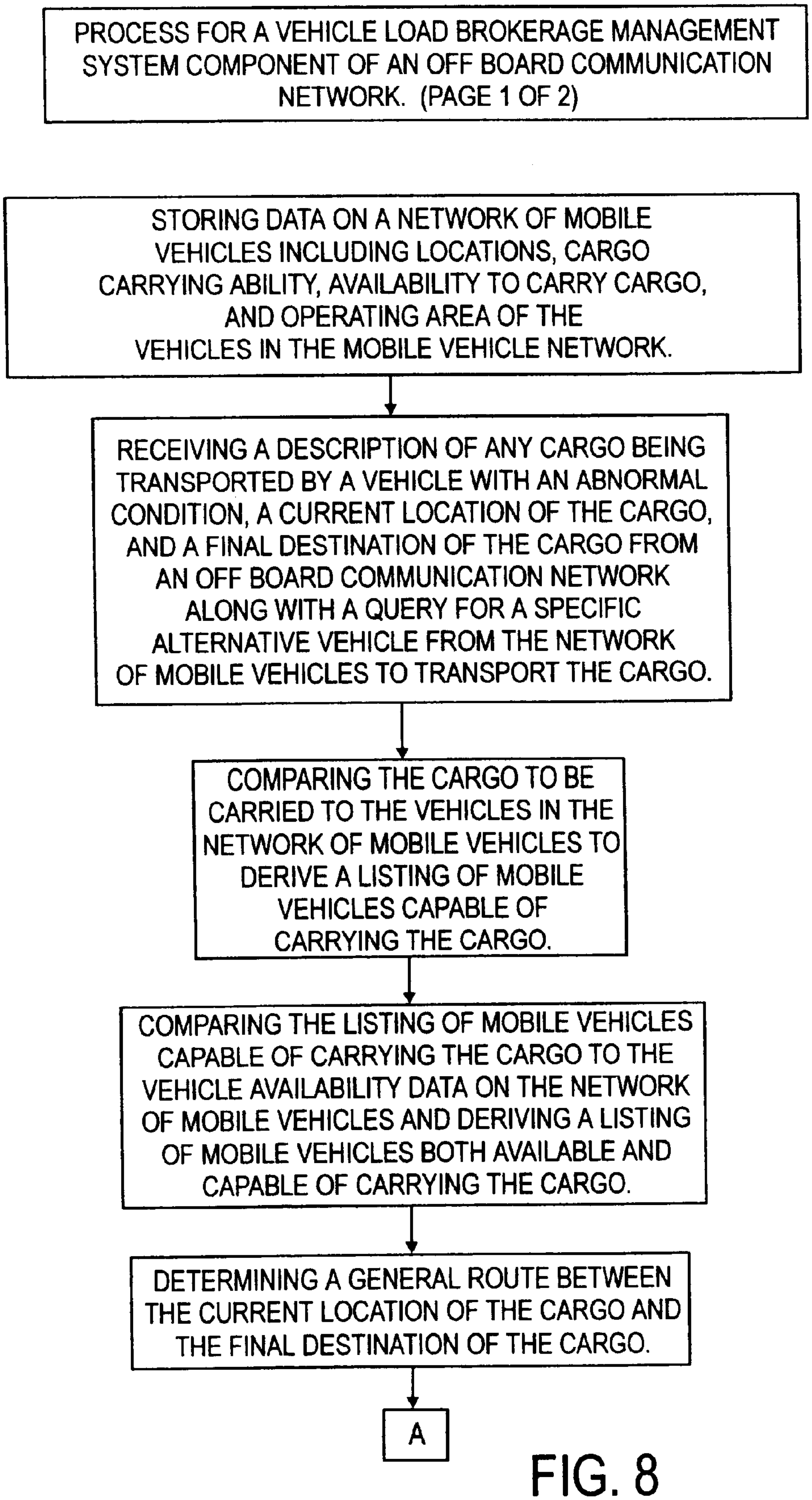
FIG. 8 is page 1 of a process for a brokerage management system component of an off board communication network made in accordance with this invention.
Figure 9:
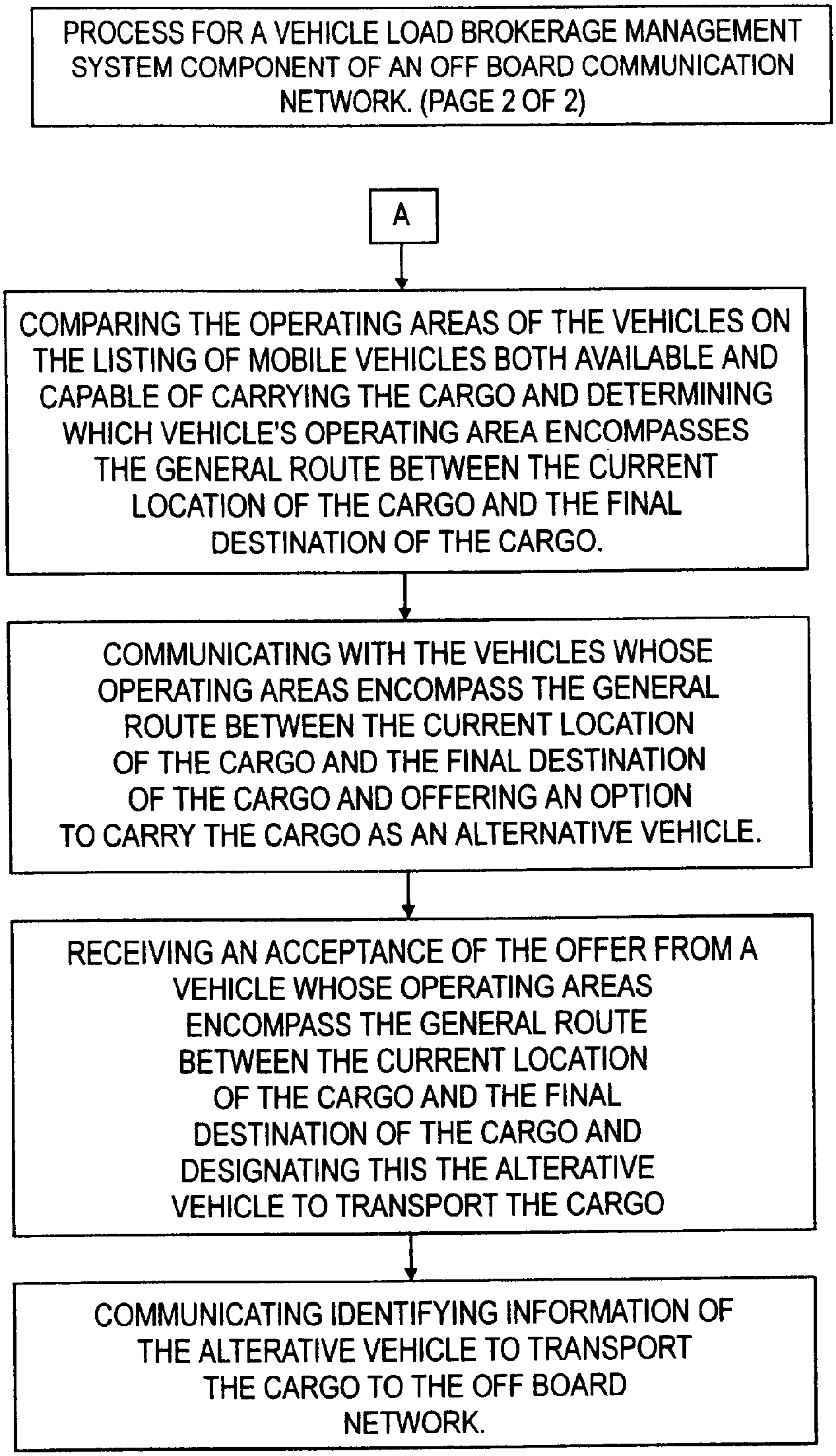
FIG. 9 is page 2 of the process of FIG. 8.
Figure 10:
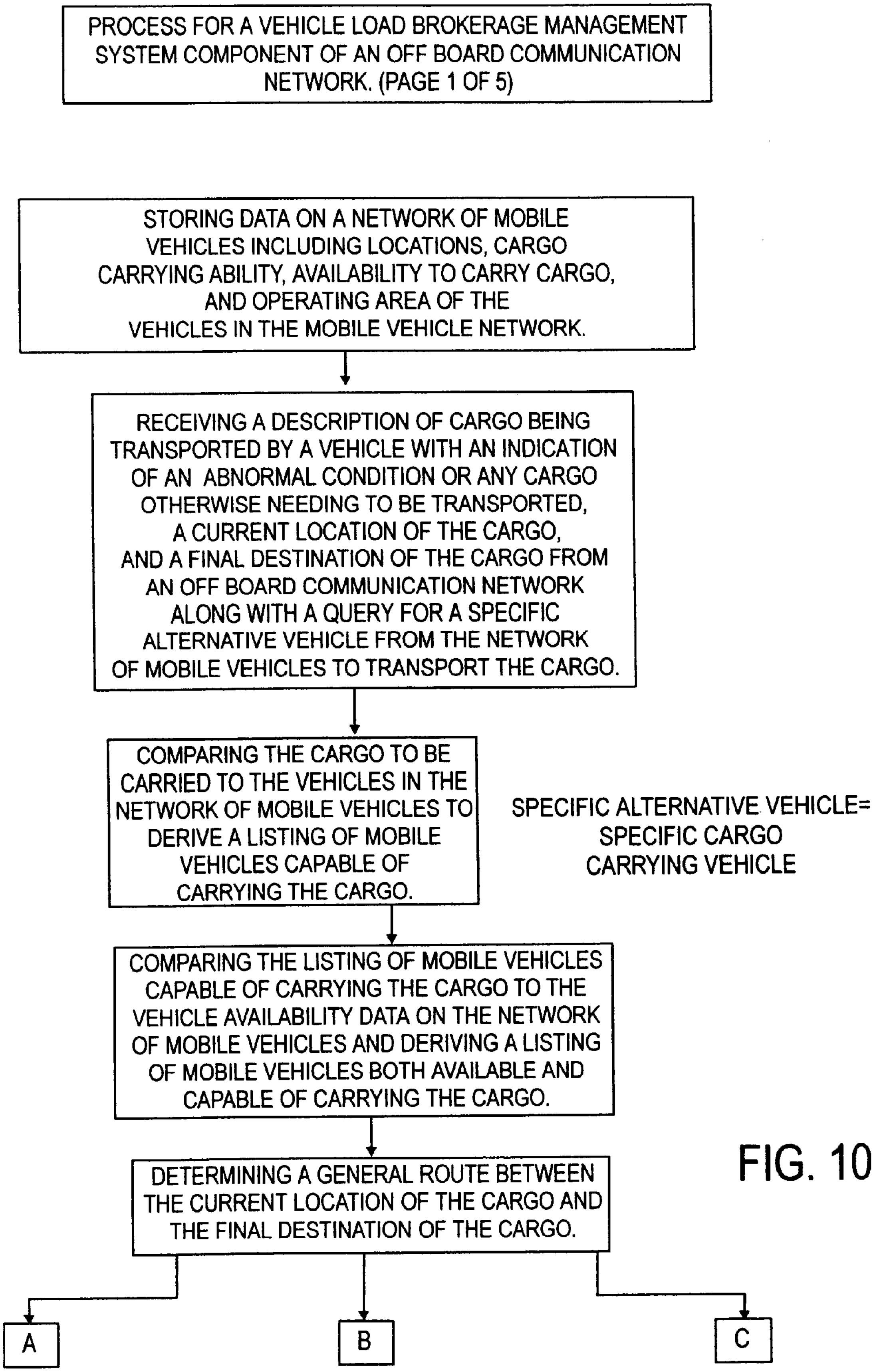
FIG. 10 is page 1 of another embodiment of a process for a brokerage management system component of an off board communication network made in accordance with this invention.

The brokerage management system 107 may perform some internal processes alone, although as mentioned above the brokerage management system may be integral to the communications control center 103 in centralized control schemes. One of these brokerage management system 107 alone processes is shown in FIGS. 8 and 9. The brokerage management system 107 stores data on a network of mobile vehicles including locations, cargo carrying ability, availability to carry cargo, and operating area of the vehicles in the mobile vehicle network. As mentioned earlier this cargo may be human passengers for a bus network as well as conventional cargo. The cargo may be items to be shipped in containers or a trailer where the vehicles 111 are highway tractors for pulling a trailer in tractor-trailer applications. The brokerage management system 107 may receive a description of any cargo being transported by a vehicle 111 with an abnormal condition, a current location of the cargo, and a final destination of the cargo from the off board network 100. There may also be a query for a specific alternative vehicle from the network of mobile vehicles to transport the cargo. Alternatively, the brokerage management system 107 may receive a description of cargo needing transportation, a current location of the cargo, and a final destination of the cargo along with a query for a specific cargo carrying vehicle from the network of mobile vehicles to transport the cargo. In either case the brokerage management system 107 compares the cargo to be carried to the vehicles in the network of mobile vehicles to derive a listing of mobile vehicles capable of carrying the cargo. The brokerage management system 107 compares the listing of mobile vehicles capable of carrying the cargo to the vehicle availability data on the network of mobile vehicles and derives a listing of mobile vehicles both available and capable of carrying the cargo. The brokerage management system 107 determines a general route between the current location of the cargo and the final destination of the cargo. The brokerage management system 107 compares the operating areas of the vehicles on the listing of mobile vehicles both available and capable of carrying the cargo and determining which vehicle's operating area encompasses the general route between the current location of the cargo and the final destination of the cargo. The brokerage management system 107 communicates with the vehicles whose operating areas encompass the general route between the current location of the cargo and the final destination of the cargo and offers an option to carry the cargo as an alternative vehicle or as a specific cargo carrying vehicle. The brokerage management system 107 receives an acceptance of the offer from a vehicle whose operating areas encompass the general route between the current location of the cargo and the final destination of the cargo and designates this the alternative vehicle to transport the cargo. The brokerage management system 107 communicates identifying information of the alternative vehicle or specific cargo carrying vehicle to the off board network 100. The brokerage management system 107 may also locate and coordinate transportation of equipment required for the transfer the cargo or people from one container or trailer to another in the event that the abnormality is related to the performance of the container or trailer.

Figure 22:
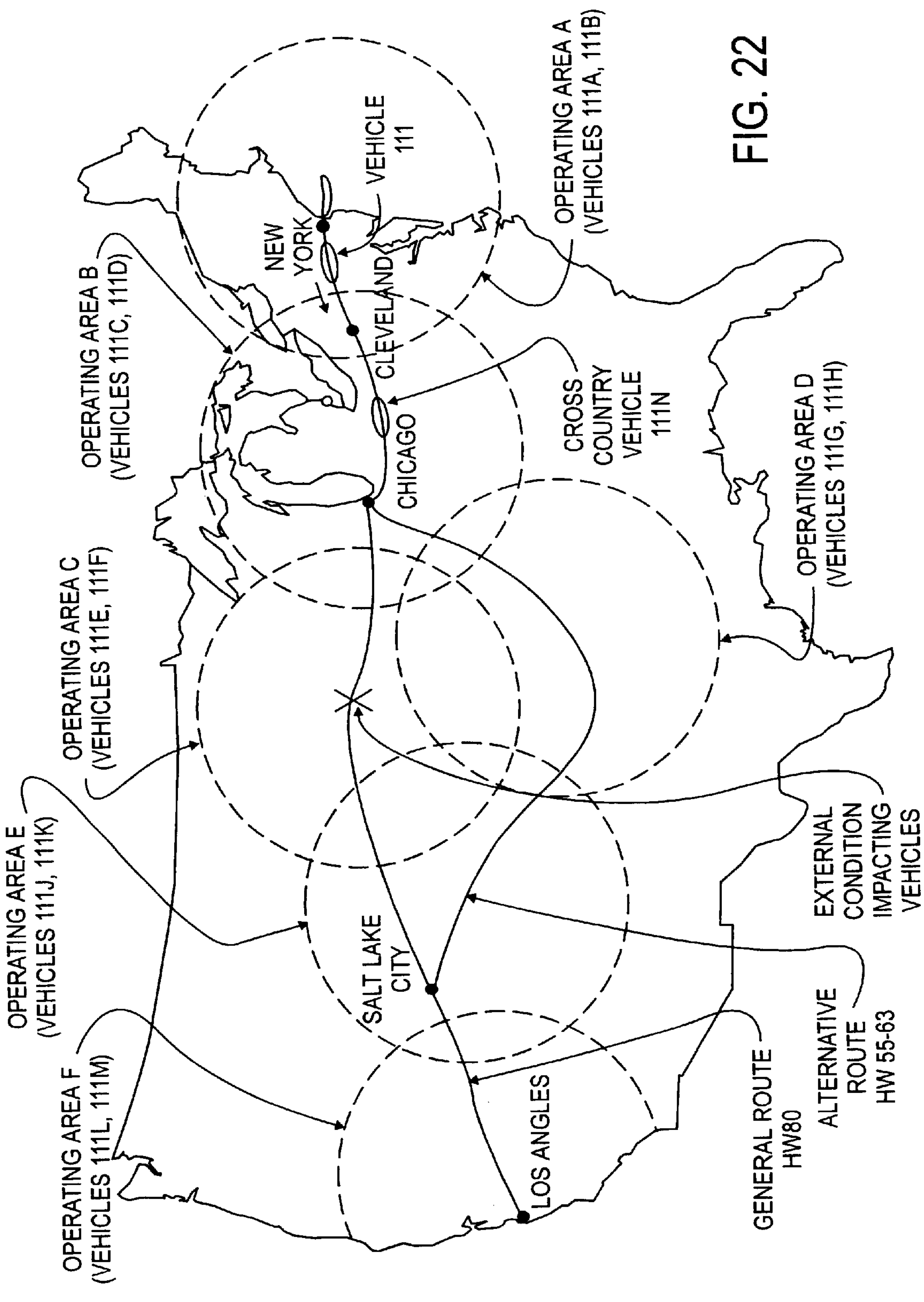
FIG. 22 is a diagram for illustrating some brokerage management system processes and external condition rerouting.

A more complex process performed by the brokerage management system 107 is shown in FIGS. 10 to 14. Reference to FIG. 22 is also illustrative. The brokerage management system 107 stores data on a network of mobile vehicles including locations, cargo carrying ability, availability to carry cargo, and operating area of the vehicles in the mobile vehicle network. Similar to the above process, the brokerage management system 107 may receive a description of any cargo being transported by a vehicle 111 with an abnormal condition, a current location of the cargo, and a final destination of the cargo from the off board network 100. There may also be a query for a specific alternative vehicle from the network of mobile vehicles to transport the cargo. Alternatively, the brokerage management system 107 may receive a description of cargo needing transportation, a current location of the cargo, and a final destination of the cargo along with a query for a specific cargo carrying vehicle from the network of mobile vehicles to transport the cargo. In either case, the brokerage management system 107 compares the cargo to be carried to the vehicles in the network of mobile vehicles to derive a listing of mobile vehicles capable of carrying the cargo. The brokerage management system 107 compares the listing of mobile vehicles capable of carrying the cargo to the vehicle availability data on the network of mobile vehicles and derives a listing of mobile vehicles both available and capable of carrying the cargo. For illustration purposes, Vehicles 111A to 111M, whose operating areas are shown on FIG. 22, are all available and capable of carrying the cargo. Vehicle 111N is a cross country vehicle with the entire country as an operating area and will be referred to in later examples. The brokerage management system 107 may determine a general route between the current location of the cargo and the final destination of the cargo. The general route of the example shown in FIG. 22 is designated HW80. The brokerage management system 107 compares the operating areas of the vehicles on the listing of mobile vehicles both available and capable of carrying the cargo to determine which (if any) vehicle's or vehicles' operating area(s) encompasses the general route.

Figure 11:
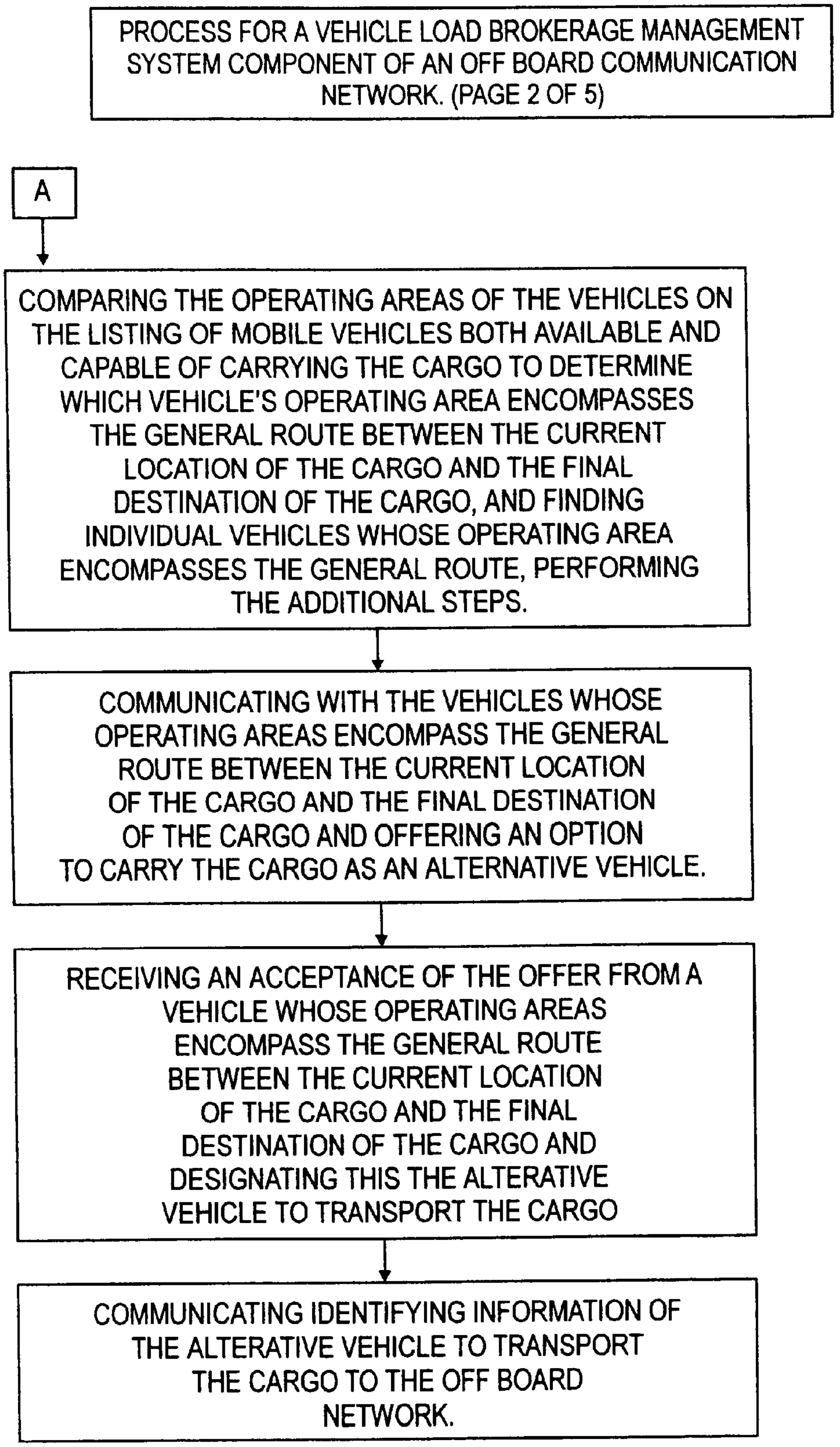
FIG. 11 is page 2 of the process of FIG. 10.

FIG. 11 indicates the brokerage management system 107 actions should there be individual vehicles which are available, capable, and whose operating area encompasses the general route. In the FIG. 22 example, the general route would be HW80 between New York and Cleveland. The brokerage management system 107 would find Vehicles 111A and 111B with operating area A encompassing the entire route on HW80 between New York and Cleveland. The brokerage management system 107 communicates with the vehicles whose operating areas encompass the general route between the current location of the cargo and the final destination of the cargo and offering an option to carry the cargo as an alternative vehicle. For the FIG. 22 example, the brokerage management system 107 would contact Vehicles 111A and 111B to make such an offer. The brokerage management system 107 would receive an acceptance of the offer from a vehicle whose operating areas encompass the general route between the current location of the cargo and the final destination of the cargo and designating this the alternative vehicle to transport the cargo. In the FIG. 22 example, Vehicle 111A would accept. The brokerage management system 107 then communicates identifying information of the alternative vehicle or specific cargo carrying vehicle to transport the cargo to the off board network 100, which for FIG. 22 would be Vehicle 111A.

Figure 12:
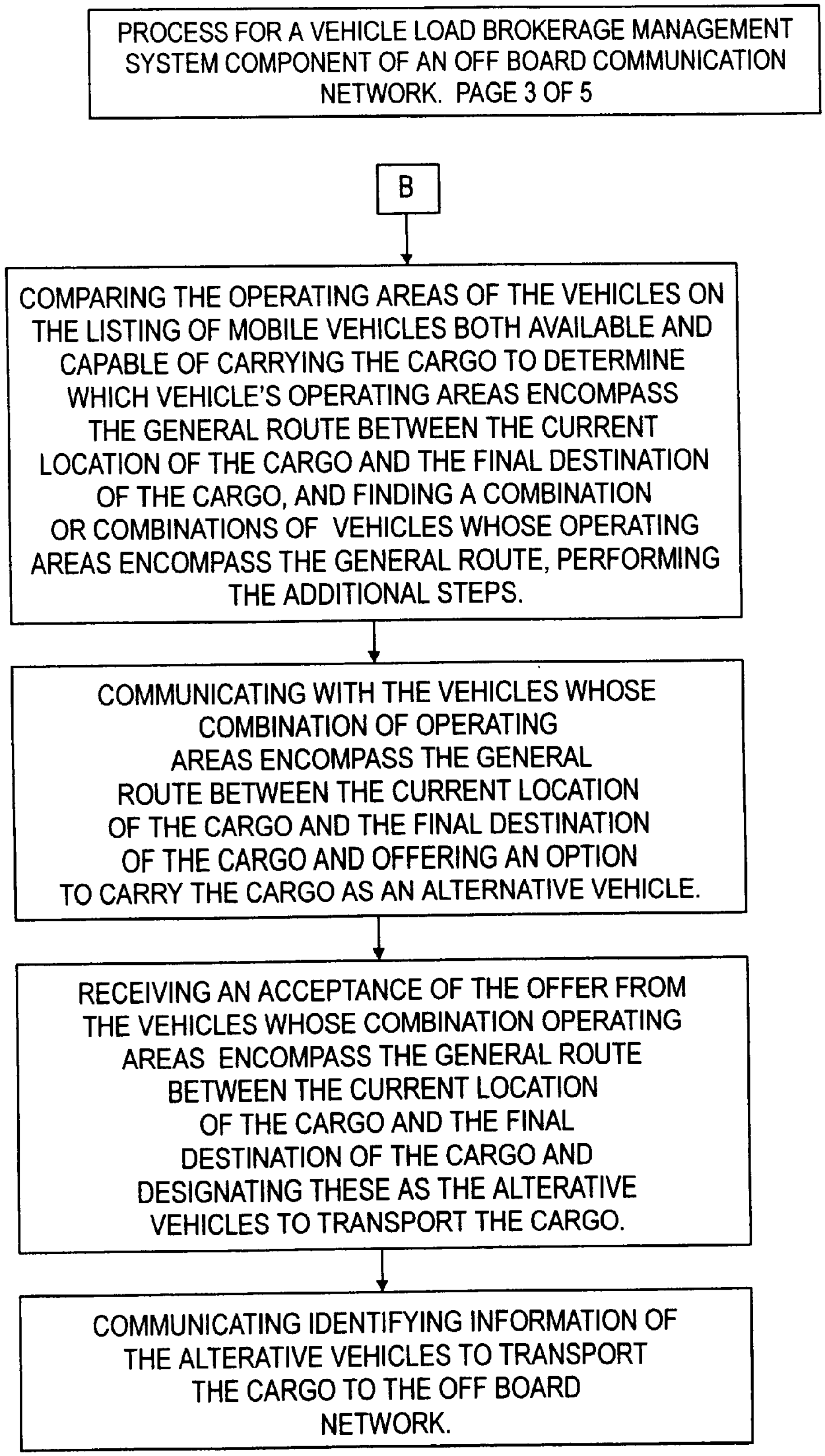
FIG. 12 is page 3 of the process of FIG. 10.
Figure 13:
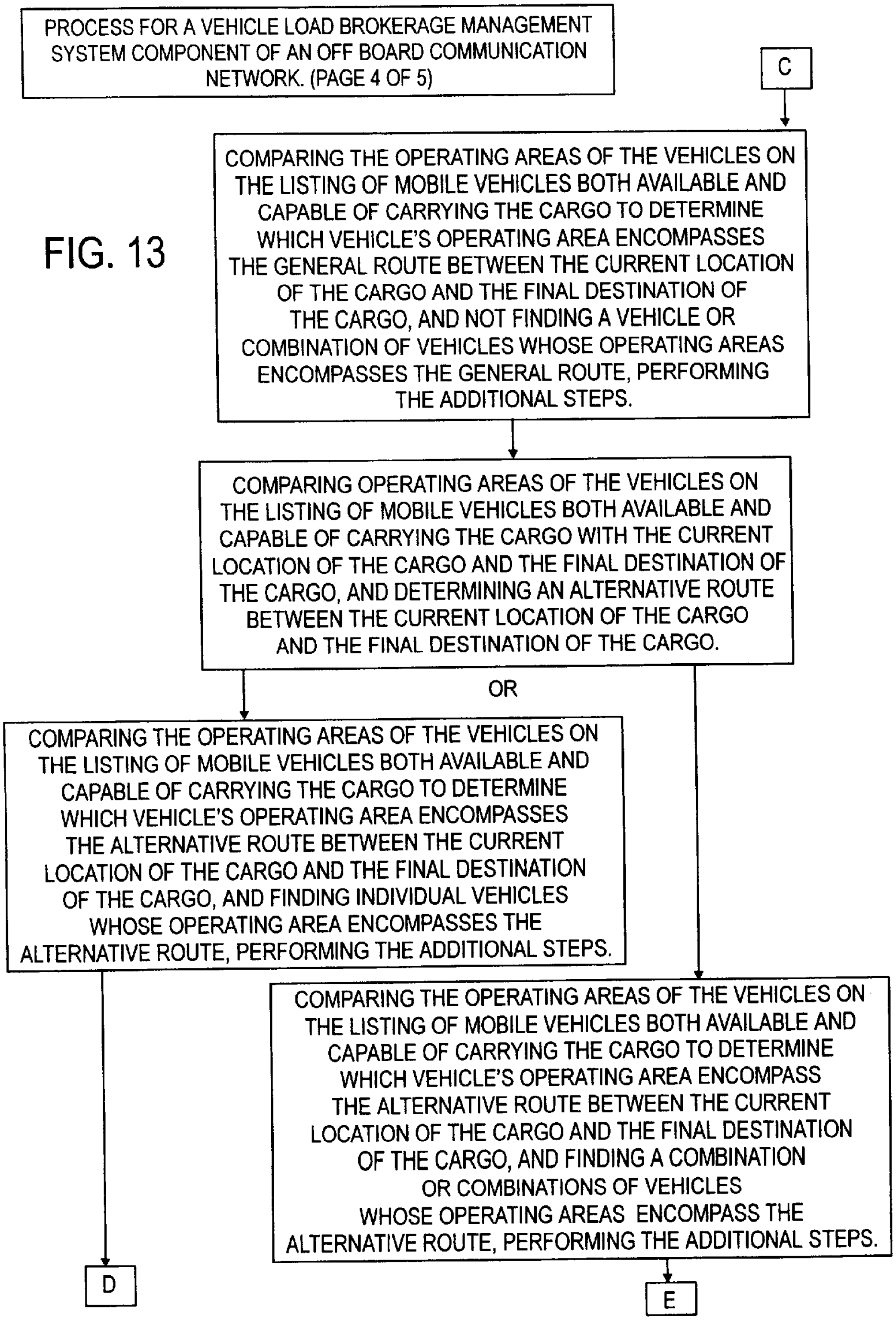
FIG. 13 is page 4 of the process of FIG. 10.
Figure 14:
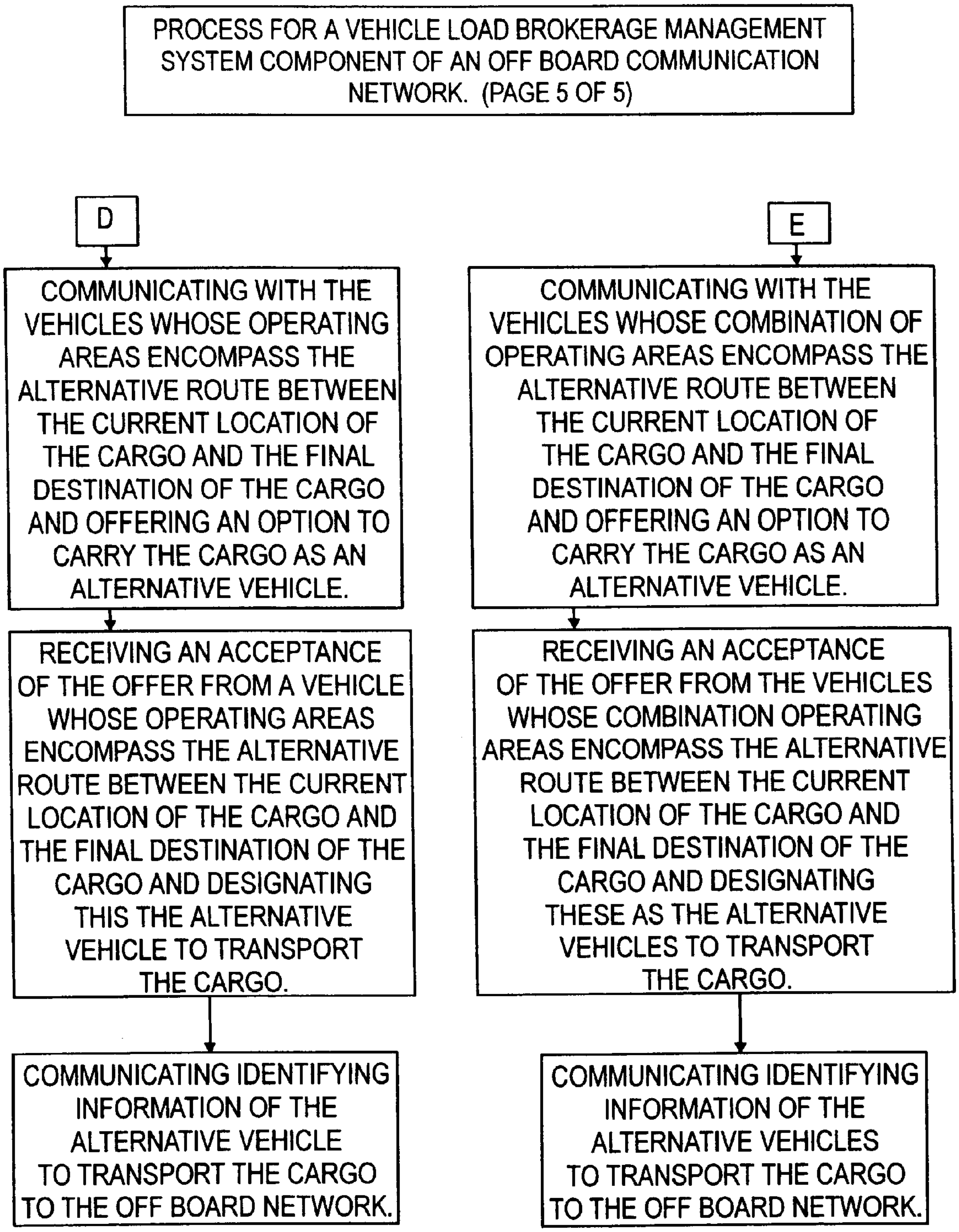
FIG. 14 is page 5 of the process of FIG. 10.

FIG. 12 indicates the brokerage management system 107 actions should there be a combination or combinations of vehicles which are available, capable, and whose operating area encompasses the general route. In the FIG. 22 example for this combination situation, the general route would be HW80 between New York and Chicago. The brokerage management system 107 would communicate with the vehicles whose combination of operating areas encompass the general route between the current location of the cargo and the final destination of the cargo and offering an option to carry the cargo as an alternative vehicle. For the New York to Chicago FIG. 22 example, the brokerage management system 107 would communicate with Vehicles 111A, 111B, 111C, and 111D whose respective operating areas are the Operating Areas designated A and B. The brokerage management system 107 would receive an acceptance of the offer from the vehicles whose combination operating areas encompass the general route between the current location of the cargo and the final destination of the cargo. The specific cargo carrying vehicles would designate these as either the alternative vehicles to transport the cargo or specific cargo carrying vehicles. The brokerage management system 107 would receive acceptance from at least one vehicle of the group of Vehicles 111A or 111B and at least one vehicle of the group of Vehicles 111C or 111D. The brokerage management system 107 would communicate identifying information of the alternative vehicles to transport the cargo or specific cargo carrying vehicles to the off board network 100. FIGS. 13 and 14 show the brokerage management system 107 actions should there be no individual vehicles or a combination or combinations of vehicles which are available, capable, whose operating area encompasses the general route, and who accept an offer to carry the cargo. In the FIG. 22 example for this situation, the general route would be HW80 between New York and Los Angeles. The brokerage management system 107 compares operating areas of the vehicles on the listing of mobile vehicles both available and capable of carrying the cargo with the current location of the cargo and the final destination of the cargo. The brokerage management system 107 determines an alternative route between the current location of the cargo and the final destination of the cargo. For the FIG. 22 example, the assumption would be that either Vehicles 111E and 111F were either not available, or not capable, or are not in the network, or did not accept an offer to carry the cargo in Operating Area C along HW80. The brokerage management system 107 would determine the alternate route to be, assuming Vehicles 111A, B, C, D, G, H, J, K, L, M, and N are capable and available, HW 80 from New York to Chicago, HW55-63 from Chicago to Salt Lake City, and HW80 from Salt Lake City to Los Angeles.

The brokerage management system 107 would compare the operating areas of the vehicles on the listing of mobile vehicles both available and capable of carrying the cargo to determine which vehicle's or combination of vehicles' operating area encompass the alternative route. Should the brokerage management system 107 find individual vehicles whose operating area encompasses the alternative route, the brokerage management system 107 communicates with the vehicles whose operating areas encompass the alternative route and offer these vehicles an option to carry the cargo as an alternative vehicle or as a specific cargo carrying vehicle. For the New York to Los Angles alternate route example shown in FIG. 22, only Vehicle 111N would be communicated with. The brokerage management system 107 may receive an acceptance of the offer from a vehicle whose operating areas encompass the alternative route. The brokerage management system 107 would communicate identifying information of the alternative vehicle to transport the cargo to the off board network 100.

In the last option, the brokerage management system 107 finds a combination of vehicles whose operating area encompasses the alternative route or if individual vehicles, such as Vehicle 111N whose individual operating area encompasses the alternate route, do not accept the offer. The brokerage management system 107 communicates with the vehicles whose combination of operating areas encompass the alternative route and offers an option to carry the cargo as an alternative vehicle or as specific cargo carrying vehicles. The offer in the FIG. 22 alternate route from New York to Los Angeles example would be to Vehicles 111A, B, C, D, G, H, J, K, L, and M. The brokerage management system 107 would receive an acceptance of the offer from the vehicles whose combination operating areas encompass the alternative route. For the FIG. 22 example, that would be at least one vehicle of each group with Operating Areas A, B, D, E, and F. Should there not be an acceptance from enough vehicles to complete this route the brokerage management system 107 would derive new alternative routes until enough vehicles accept to complete the route. The brokerage management system 107 communicates identifying information of the alternative vehicles to transport the cargo to the off board network 100.

Figure 21:
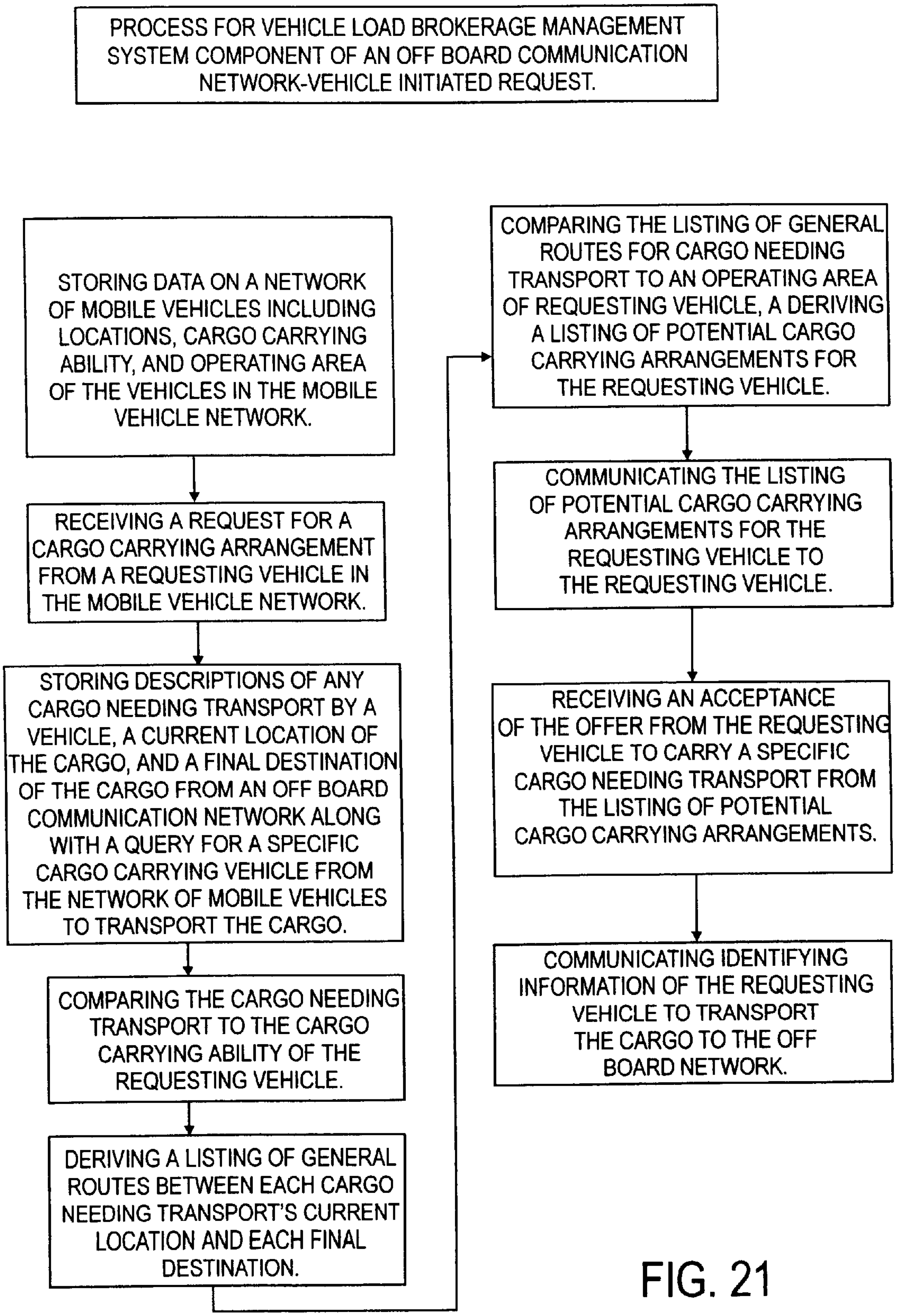
FIG. 21 is a vehicle initiated process for a brokerage management system component of an off board communication network made in accordance with this invention.

The above example is for the situations where either a vehicle slated to carry a cargo can not or where a shipper needs a cargo shipped. Another method of cargo coordination performed by the brokerage management system 107 is where a vehicle 111 in the network requests a cargo to carry. An embodiment of this vehicle requested cargo coordination process is shown in FIG. 21. As above, the brokerage management system 107 stores data on a network of mobile vehicles including locations, cargo carrying ability, and operating area of the vehicles in the mobile vehicle network. The brokerage management system 107 receives a request for a cargo carrying arrangement from a requesting vehicle in the mobile vehicle network. The brokerage management system 107 stores descriptions of any cargo needing transport, a current location of the cargo, and a final destination of the cargo along with a query for a specific cargo carrying vehicle from the network of mobile vehicles to transport the cargo. The brokerage management system 107 compares the cargo needing transport to the cargo carrying ability of the requesting vehicle 111. Then the brokerage management system 107 derives a listing of general routes between each cargo needing transport's current location and each final destination. The brokerage management system 107 compares the listing of general routes for cargo needing transport to an operating area of requesting vehicle, and derives a listing of potential cargo carrying arrangements for the requesting vehicle 111. The brokerage management system 107 communicates the listing of potential cargo carrying arrangements for the requesting vehicle to the requesting vehicle 111. The brokerage management system 107 receives an acceptance of the offer from the requesting vehicle 111 to carry a specific cargo needing transport from the listing of potential cargo carrying arrangements. The brokerage management system 107 communicates identifying information of the requesting vehicle to transport the cargo to the off board network. This process may additionally include deriving and providing driving directions to the vehicle 111 to a rendezvous location to accept the cargo.

Figure 15:
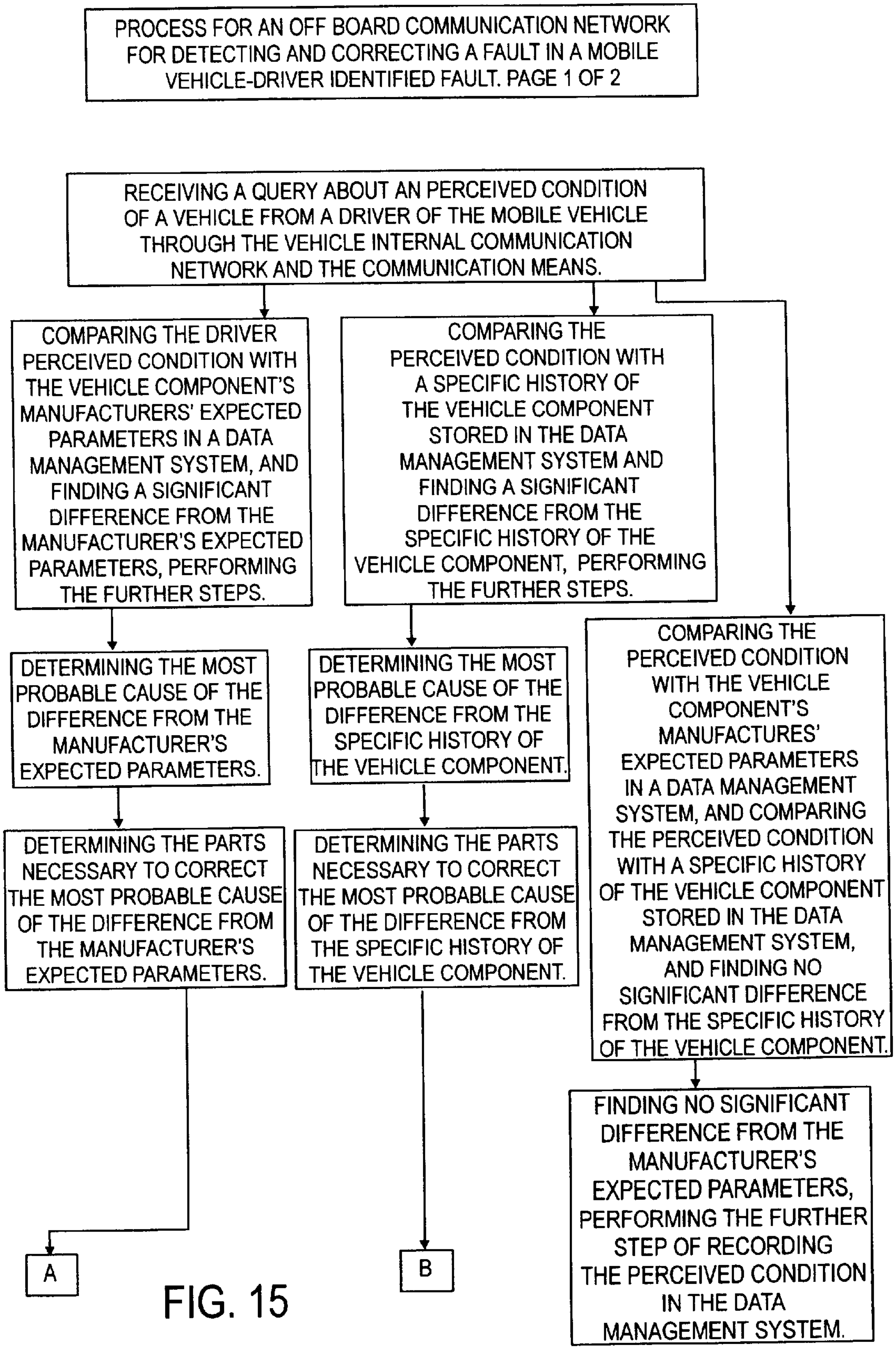
FIG. 15 is page 1 of a driver initiated process for an off board communication network for detecting and correcting a fault in a mobile vehicle made in accordance with this invention.
Figure 16:
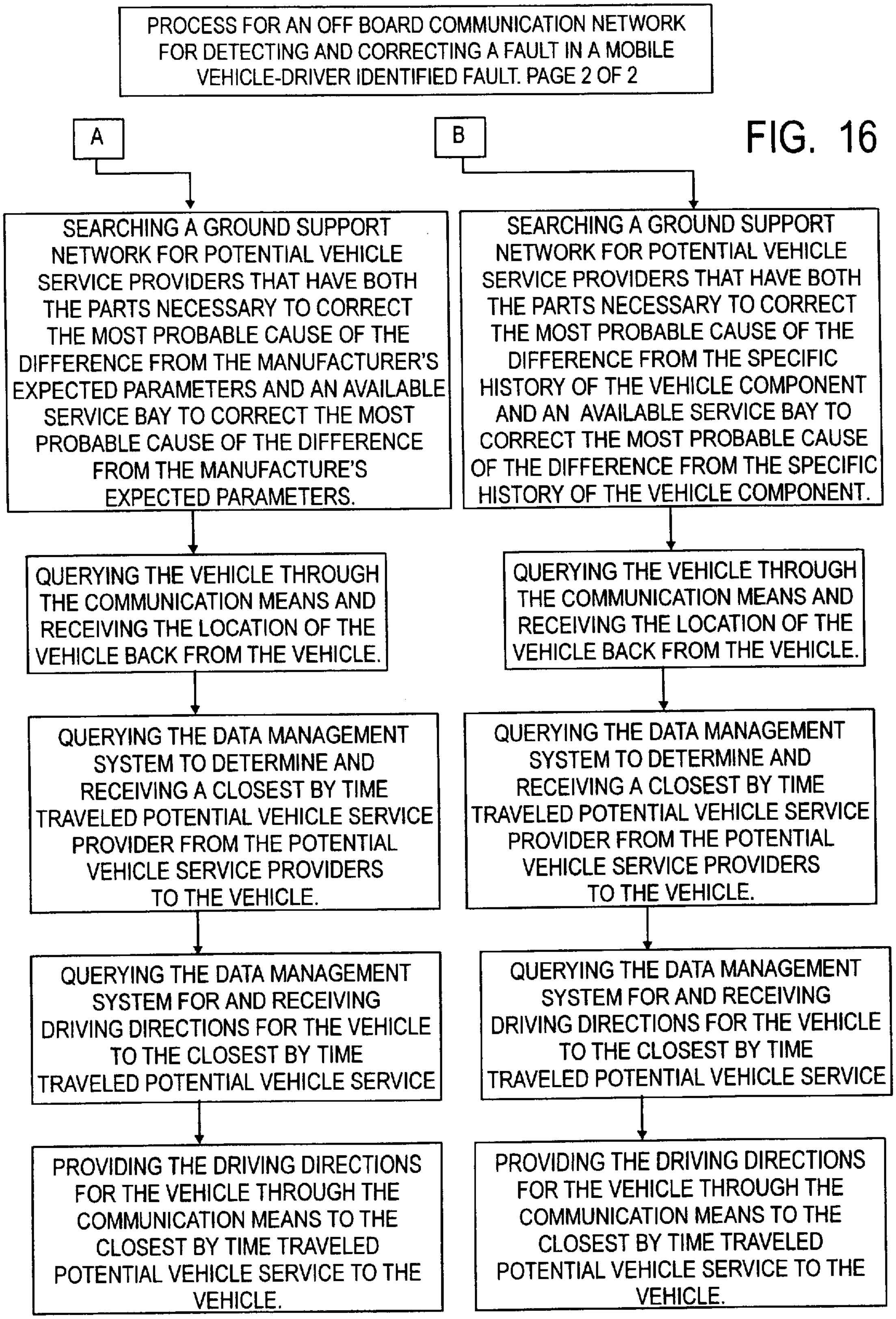
FIG. 16 is page 2 of the process of FIG. 15.
Figure 17:
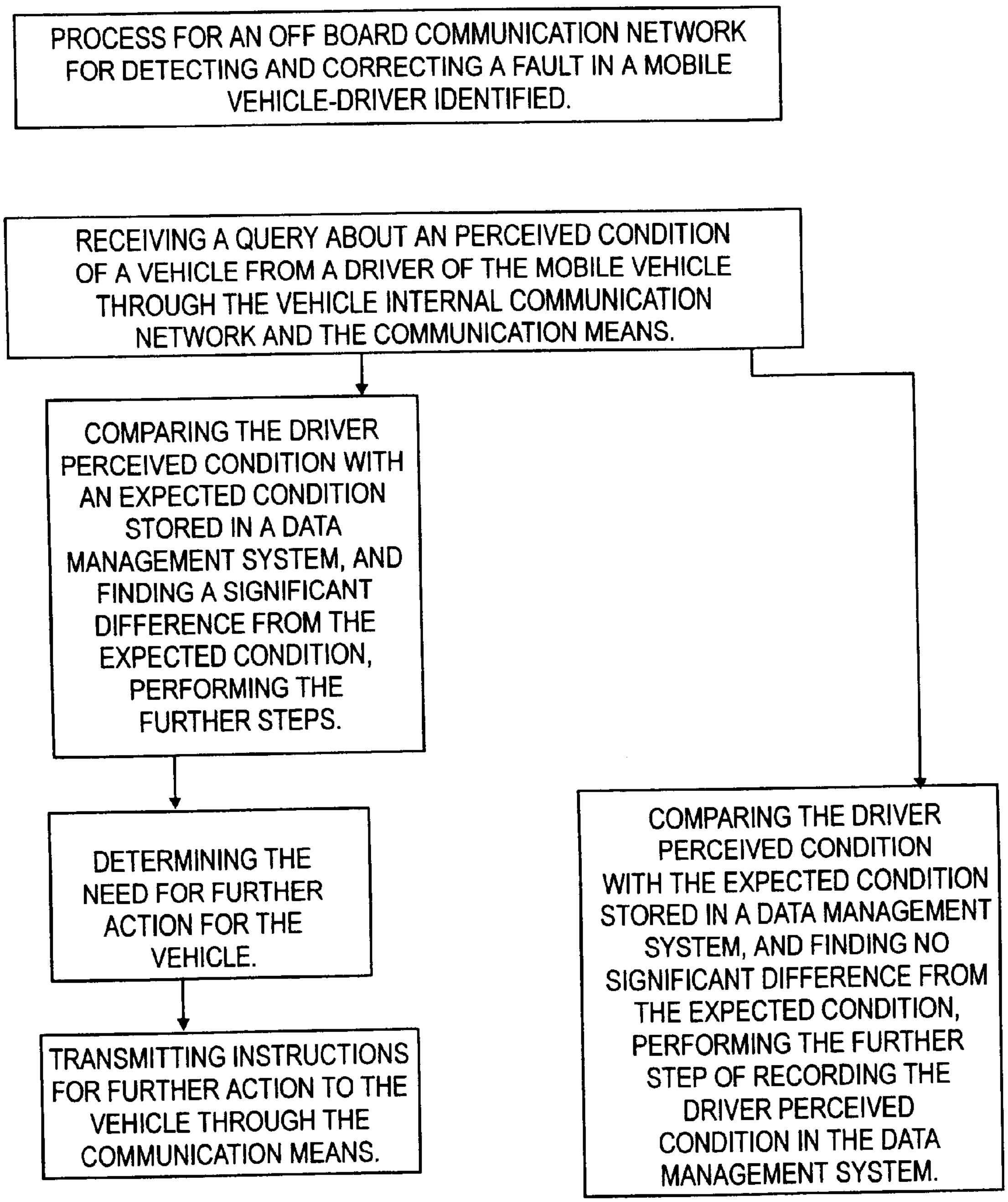
FIG. 17 is another embodiment of a driver initiated process for an off board communication network for detecting and correcting a fault in a mobile vehicle made in accordance with this invention.
Figure 18:
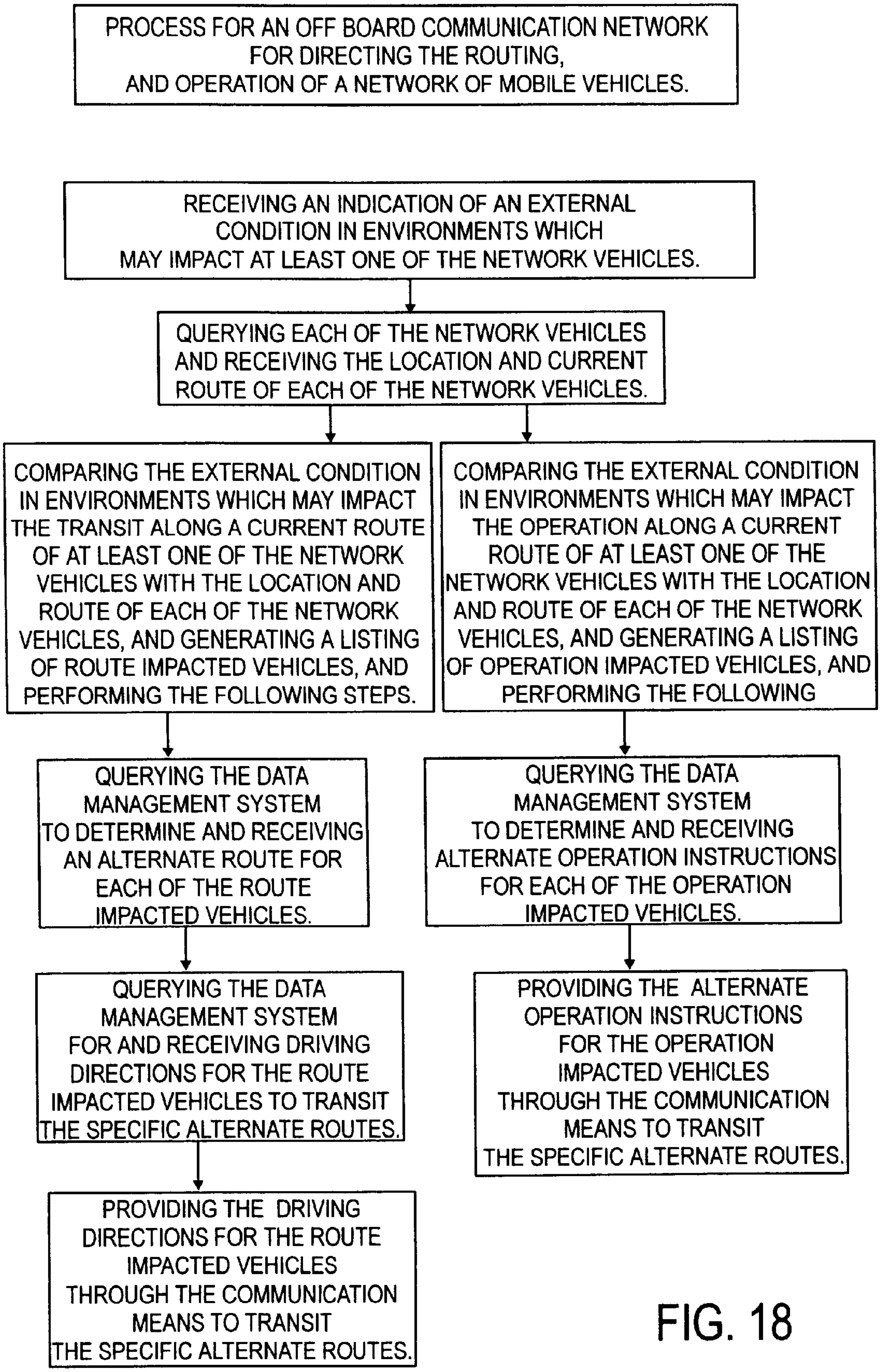
FIG. 18 is an external condition initiated process for directing the routing and operation of a network of mobile vehicles made in accordance with this invention.

The process described above for the off board network 100 and shown in FIGS. 3 and 4 were for a vehicle sensed abnormal condition. The architecture of this invention may also respond similarly for driver perceived conditions. An example of the process for a driver perceived condition is shown in FIGS. 15 and 16. The driver may inform the off board network of perceived condition. The onboard network 100 processes and responds as it would for a vehicle sensed condition. Some examples of things a driver may perceive include things he or she may see, hear, smell, or feel while operating the vehicle 111. The off board network 100 may go through the same processes as identifying causes, and actions such as parts, service providers from the ground support network 105. FIG. 17 shows an analogous process for a driver perceived condition as the vehicle sensed condition of FIG. 5, with all the associated variations as far as determining cause, and arranging parts, service, and alternative cargo carriers if necessary.

The off board network 100 as mentioned above may use information on external conditions to route, re-route and direct operation of vehicles a network of mobile vehicles. The external conditions may be but are not limited to weather related, traffic, road work, animal road crossings, natural disasters, or human instigated conditions. The external conditions may be detected and communicated by external sources such as a national weather service or national transportation authorities or local and national news services. The external conditions may also be detected by using the vehicles in the network of mobile vehicles as mobile sensors for the off board network 100 as a whole. The first step is the off board network 100 receiving an indication of an external condition in environments which may impact at least one of the network vehicles. The off board network 100 queries and receives from each of the network vehicles 111 for the location and current route of each of the vehicles 111.

The off board network 100 compares the external condition in environments which may impact the transit along a current route of at least one of the network vehicles with the location and route of each of the network vehicles 111. The off board network 100 generates a listing of route impacted vehicles. Impact on the transit of the vehicles means the specific roads and highways the vehicles are traveling on. The off board network 100 queries the data management system 106 to provide an alternate route for each of the route impacted vehicles. The off board network 100 queries the data management system 106 for and receives driving directions for the route impacted vehicles to transit the specific alternate routes. The off board network 100 provides the driving directions for the route impacted vehicles through the communication means to transit the specific alternate routes. FIG. 22 contains an illustration of transit rerouting. Assume vehicle 111 N was transiting general route HW80 from New York to Los Angeles, and the off board network 100 detected an external condition which may impact transit, as shown, between Chicago and Salt Lake City. The off board network 100 might redirect Vehicle 111N to take alternate route HW 55-63 at Chicago until reaching Salt Lake City, where Vehicle 111N would return to HW 80.

In some cases the external condition may also or alternatively impact operation of a transiting vehicle. For instance, if the condition shown on HW 80 of FIG. 22 was a snow storm, the off board network 100 might direct HW 80 to proceed with caution, obtain chains, or take other snow related actions. If the external the condition impacts operation of the vehicle, the off board network 100 compares the external condition in environments with the location and route of each of the network vehicles. The off board network 100 generates a listing of operation impacted vehicles. Subsequently the off board network 100 queries the data management system 106 to determine and receiving alternate operation instructions for each of the operation impacted vehicles. The off board network 100 provides the alternate operation instructions for the operation impacted vehicles through the communication means.

Figure 20:
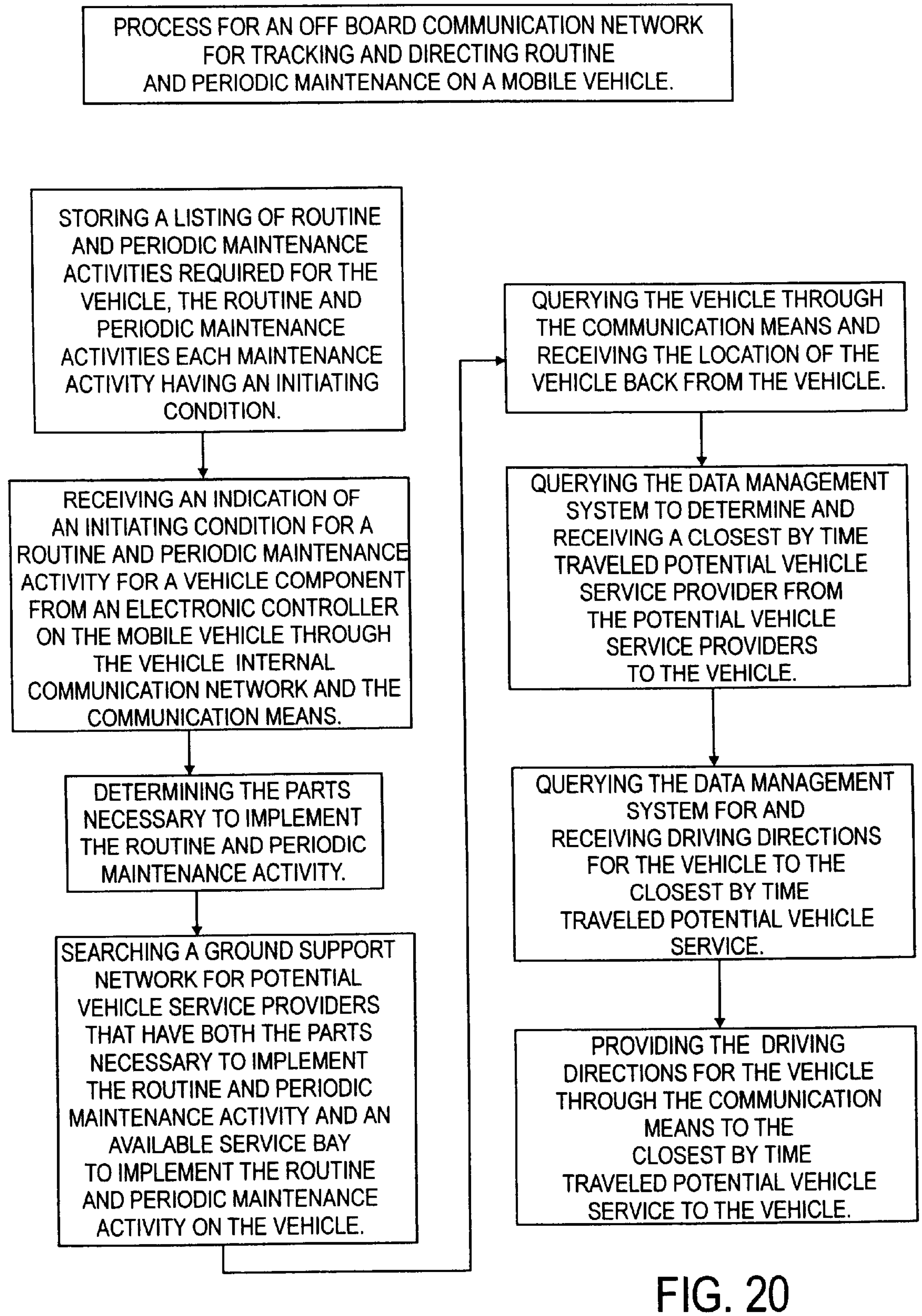
FIG. 20 is a process for an off board communication network for tracking and directing routine and periodic maintenance of a mobile vehicle made in accordance with this invention.

The off board network 100 as shown in FIGS. 3 to 5 may direct and route vehicles in response to faults or unexpected maintenance needs of vehicles 111 in the network of vehicles. Additionally, the off board network 100 may track and direct vehicle routing for routine and periodic maintenance on the vehicles. One embodiment of such a routine maintenance process is shown in FIG. 20. The off board network 100 or the data management system 106 stores a listing of routine and periodic maintenance activities required for the vehicle, the routine and periodic maintenance activities each maintenance activity having an initiating condition. The off board network 100 receives an indication of an initiating condition for a routine and periodic maintenance activity for a vehicle component from an electronic controller on the mobile vehicle through the vehicle internal communication network and the communication means. One example of an initiating condition may be an odometer reading. The off board network 100 for example may direct routine maintenance such as engine oil changes and tune ups. The first step of this process is the off board network 100 receives an indication of an initiating condition for a routine and periodic maintenance activity for a vehicle component from an electronic controller on the mobile vehicle 111 through the vehicle internal communication network 112 and the communication means. The network 100 determines the parts necessary to implement the routine and periodic maintenance activity. The network then searches a ground support network 105 for potential vehicle service providers that have both the parts necessary to implement the routine and periodic maintenance activity and an available service bay to implement the routine and periodic maintenance activity on the vehicle 111. The network 100 queries the vehicle 111 through the communication means and receives the location of the vehicle 111. The data management system 106 is queried to determine a closest by time traveled potential vehicle service provider from the potential vehicle service providers to the vehicle. The data management system 106 provides identifying information for the closest by time traveled potential vehicle service provider. The data management system 106 is queried for and provides driving directions for the vehicle 111 to the closest by time traveled potential vehicle service. The off board network 100 provides the driving directions for the vehicle 100 through the communication means to the closest by time traveled potential vehicle service. Additional steps may include the arrangement for an alternate carrier for any cargo on the vehicle 111 as described above.

The processes may be programmed into a computer or the program may be a computer program product comprised of a computer usable medium having computer readable program code means embodied in the medium for affecting the above process when used in conjunction with a computing system.

As described above, the intelligent information system architecture including the off board network 100, the vehicles 111, and the processes for commercial and other transportation vehicles provide a number of advantages, some of which have been described above and others that are inherent in the invention. Also modifications may be proposed to the intelligent information system architecture, the off board network 100, the vehicles 111, and the processes for commercial and other transportation vehicles without departing from the teachings herein.

We claim:

1. A computer program product for an off board communication network for tracking and directing routine and periodic maintenance on a mobile vehicle having an engine engaged to a transmission engaged to a drive train for driving an axle with wheels, the vehicle having an internal communication backbone to which electronic controllers of the vehicle are electrically engaged, the electronic controllers monitoring certain vehicle components and the vehicle in contact with the off board communication network through communication means engaged to the internal communication network, said computer program product comprising:

a computer useable medium having computer readable program code means embodied in said medium for causing the off board network to store a listing of routine and periodic maintenance activities required for the vehicle, the routine and periodic maintenance activities each maintenance activity having an initiating condition;

computer readable program code means for causing the off board network to receive an indication of an initiating condition for a routine and periodic maintenance activity for a vehicle component from an electronic controller on the mobile vehicle through the vehicle internal communication network and the communication means;

computer readable program code means for causing the off board network to determine the parts necessary to implement the routine and periodic maintenance activity;

computer readable program code means for causing the off board network to search a ground support network for potential vehicle service providers that have both the parts necessary to implement the routine and periodic maintenance activity and an available service bay to implement the routine and periodic maintenance activity on the vehicle;

computer readable program code means for causing the off board network to query the vehicle through the communication means and receiving the location of the vehicle back from the vehicle;

computer readable program code means for causing the off board network to query the data management system to determine and receiving a closest by time traveled potential vehicle service provider from the potential vehicle service providers to the vehicle;

computer readable program code means for causing the off board network to query the data management system for and receiving driving directions for the vehicle to the closest by time traveled potential vehicle service; and computer readable program code means for causing the off board network to provide the driving directions for the vehicle through the communication means to the closest by time traveled potential vehicle service to the vehicle.

* * * * *